United States Patent [19]

Walter

[11] Patent Number: 5,467,322
[45] Date of Patent: Nov. 14, 1995

[54] WATER HAMMER DRIVEN VIBRATOR

[76] Inventor: Bruno H. Walter, 902 Wentworth Ave., North Vancouver, British Columbia, Canada, V7R 1R7

[21] Appl. No.: 329,713

[22] Filed: Oct. 26, 1994

Related U.S. Application Data

[63] Continuation-in-part of Ser. No. 936,032, Aug. 25, 1992.

[51] Int. Cl.$^6$ ................................................ H04R 17/00
[52] U.S. Cl. .................. 367/142; 367/143; 367/191; 181/0.5; 181/119; 210/748; 210/785
[58] Field of Search ................................ 367/142, 143, 367/171, 191; 181/0.5, 119, 120; 210/748, 785

[56] References Cited

U.S. PATENT DOCUMENTS

| | | | |
|---|---|---|---|
| 2,647,846 | 8/1953 | Bagno | 367/142 |
| 3,369,519 | 2/1968 | Bricout | 116/27 |
| 3,376,949 | 4/1968 | Baker et al. | 181/0.5 |
| 3,409,470 | 11/1968 | Karpovich | 134/1 |
| 3,536,157 | 10/1970 | Anstey | 181/0.5 |
| 3,690,403 | 9/1972 | Davis | 181/0.5 |
| 3,764,965 | 10/1973 | McLean et al. | 340/12 |
| 4,131,178 | 12/1978 | Bouyoucos | 181/120 |
| 4,252,210 | 2/1981 | Sodich | 181/119 |
| 4,271,925 | 6/1981 | Burg | 181/120 |
| 4,396,088 | 8/1983 | Bayhi | 181/120 |
| 4,713,277 | 12/1987 | Akiyama et al. | 428/131 |
| 4,830,122 | 5/1989 | Walter | 175/106 |
| 5,009,272 | 4/1991 | Walter | 175/56 |
| 5,085,783 | 2/1992 | Feke et al. | 210/748 |
| 5,129,320 | 7/1992 | Fadner | 101/365 |

FOREIGN PATENT DOCUMENTS

| | | |
|---|---|---|
| 1359616 | 3/1964 | France . |
| 620483 | 10/1935 | Germany . |
| 510300 | 4/1976 | U.S.S.R. . |

*Primary Examiner*—J. Woodrow Eldred
*Attorney, Agent, or Firm*—Oyen Wiggs Green & Mutala

[57] ABSTRACT

The invention provides apparatus for shaking structures such as fins in a fluid agitator, shaking tables, shaking screens, conveyors, or the walls of bins or hoppers. The apparatus is driven by a hydraulic driving system in which high pressure pulses are generated by repeatedly creating water hammer within a conduit. The high pressure pulses are directed to a chamber where they act against a wall of the chamber to periodically push on the structure. Preferably, the structure is spring-like so that after a high pressure pulse has passed the wall of the chamber is returned to its equilibrium position. In one embodiment of the invention a water hammer pressure pulse is directed into a reinforced hose in contact with a surface to be vibrated. The high pressure pulse causes the hose to expand and move the surface to be vibrated. Water hammer pulses are generated periodically so that the surface is maintained in continuous vibration.

1 Claim, 25 Drawing Sheets

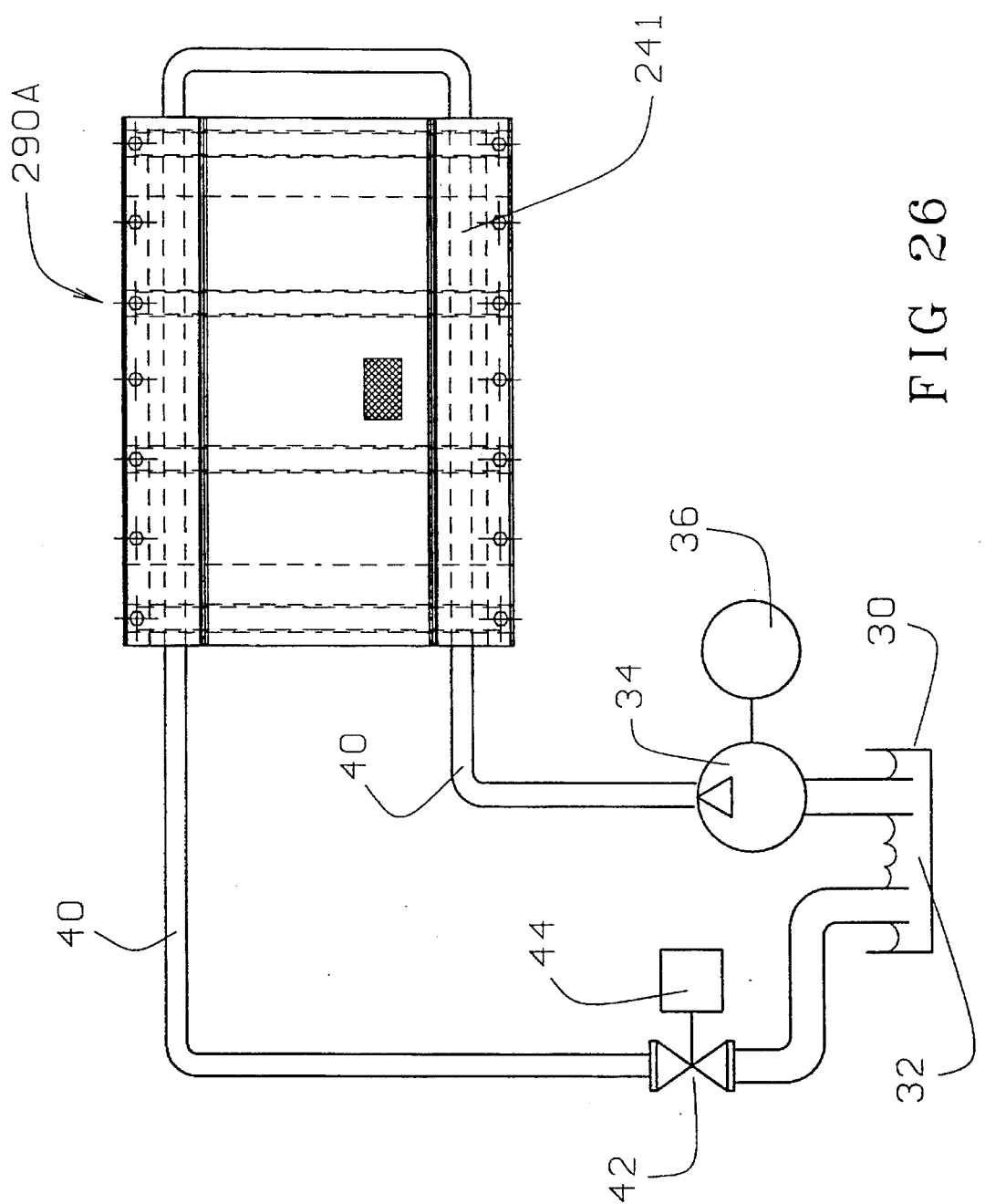

5,467,322

1
WATER HAMMER DRIVEN VIBRATOR

CROSS REFERENCE TO RELATED APPLICATIONS

This application is a continuation-in-part of co-pending patent application Ser. No. 07/936,032 filed 08/25/92 entitled METHOD AND APPARATUS FOR GENERATION OF HIGH ENERGY ACOUSTIC PULSES.

FIELD OF THE INVENTION

This application relates to devices used for shaking industrial devices or structures. The structure may be the wall of a hopper or bin, a screen for separating finer particles from coarser particles, a shaker table, a fin for agitating or stirring a liquid, or the like.

BACKGROUND OF THE INVENTION

Vibrators are used in many industrial applications where it is necessary to shake a structure or device with high amplitude vibrations. For example, vibrators are used to: shake screens for separating particles, such as crushed rock, by size; to vibrate bins and hoppers to prevent granular particles from "bridging" and to help granular particles flow; and to vibrate pieces of machinery, such as steam rollers. Various types of vibrators are currently available. All of these vibrators have disadvantages.

Many prior art vibrators cause vibration by turning an unbalanced rotor with an electric or hydraulic motor or by compressed air. These vibrators tend to be expensive because they require precision heavy-duty bearings and/or are inefficient at converting input energy into vibrational energy.

Water hammer is a phenomenon by which high intensity pressure pulses are produced in a confined body of flowing liquid when the flow of the liquid is suddenly blocked. Water hammer is lo generally undesirable, and can be destructive. Much effort is spent in the design of plumbing systems to avoid water hammer. Water hammer pressure pulses have not been previously used to drive industrial vibrators. The mathematics of water hammer are discussed in various texts on fluid mechanics including *Fluid Mechanics (7th Edition)* Victor L. Streeter and E. Benjamin Wylie, McGraw-Hill Book Company, 1979 and R. L. Daugherty and J. B. Franzini, *Fluid Mechanics With Engineering Applications*, pages 425–431 McGraw Hill Book Company, 1977.

Water hammer has been used to generate acoustic pulses for use in marine seismic exploration. For example, Baker et al., U.S. Pat. No. 3,376,949, Anstey, U.S. Pat. No. 3,536,157 Burg, U.S. Pat. No. 4,271,925, Bricout, U.S. Pat. No. 3,369,519 and Davis, U.S. Pat. No. 3,690,403 disclose underwater acoustic generators, also for use in underwater seismic exploration. Each of these devices use a deliberately created water hammer to produce a one-shot high amplitude burst of acoustic signals appropriate for geophysical seismic exploration. Akimoff, German patent No. 620,483, discloses a siren for broadcasting noise into air wherein the noise is generated by a series of water hammers in a pipe.

Bayhi, U.S. Pat. No. 4,396,088 discloses a generator of low power, low frequency acoustic waves for seismic exploration. The Bayhi apparatus modulates the flow of fluid flowing into an array of flexible sleeves at the frequency of the desired sound. Bayhi does not disclose the use of water hammer and is not designed for or adapted to shake industrial machinery or structures.

2
SUMMARY OF THE INVENTION

This invention provides a vibrator suitable for use in industrial settings which uses water-hammer pressure pulses to shake a member. One aspect of the invention provides a vibrator for vibrating a member. The vibrator comprises a hydraulic driving system and an actuator. The hydraulic driving system comprises: a conduit having an inlet and an outlet; a source of pressurized fluid connected to the inlet; a valve in the conduit; and a valve actuator operatively associated with the valve for repeatedly opening and closing the valve to create a continuous series of water hammers in the conduit. The actuator is in fluid communication with the conduit upstream from the valve. The actuator comprises: a wall enclosing a fluid-filled volume; means for transmitting changes in a pressure in the conduit into the fluid-filled volume; a movable section in the wall, which is displaceable between a first position and a second position by increasing a fluid pressure in the fluid filled volume; means for holding the movable section of the wall in contact with a member to be vibrated; and, bias means biasing the movable wall toward the first position.

BRIEF DESCRIPTION OF THE DRAWINGS

The invention will now be described with reference to the accompanying drawings which illustrate specific embodiments of the invention, but which should not be construed as restricting the spirit or scope of the invention in any way:

FIG. 26 is a partially schematic top-plan view thereof.

DETAILED DESCRIPTION OF THE PREFERRED EMBODIMENT

Figure 1:
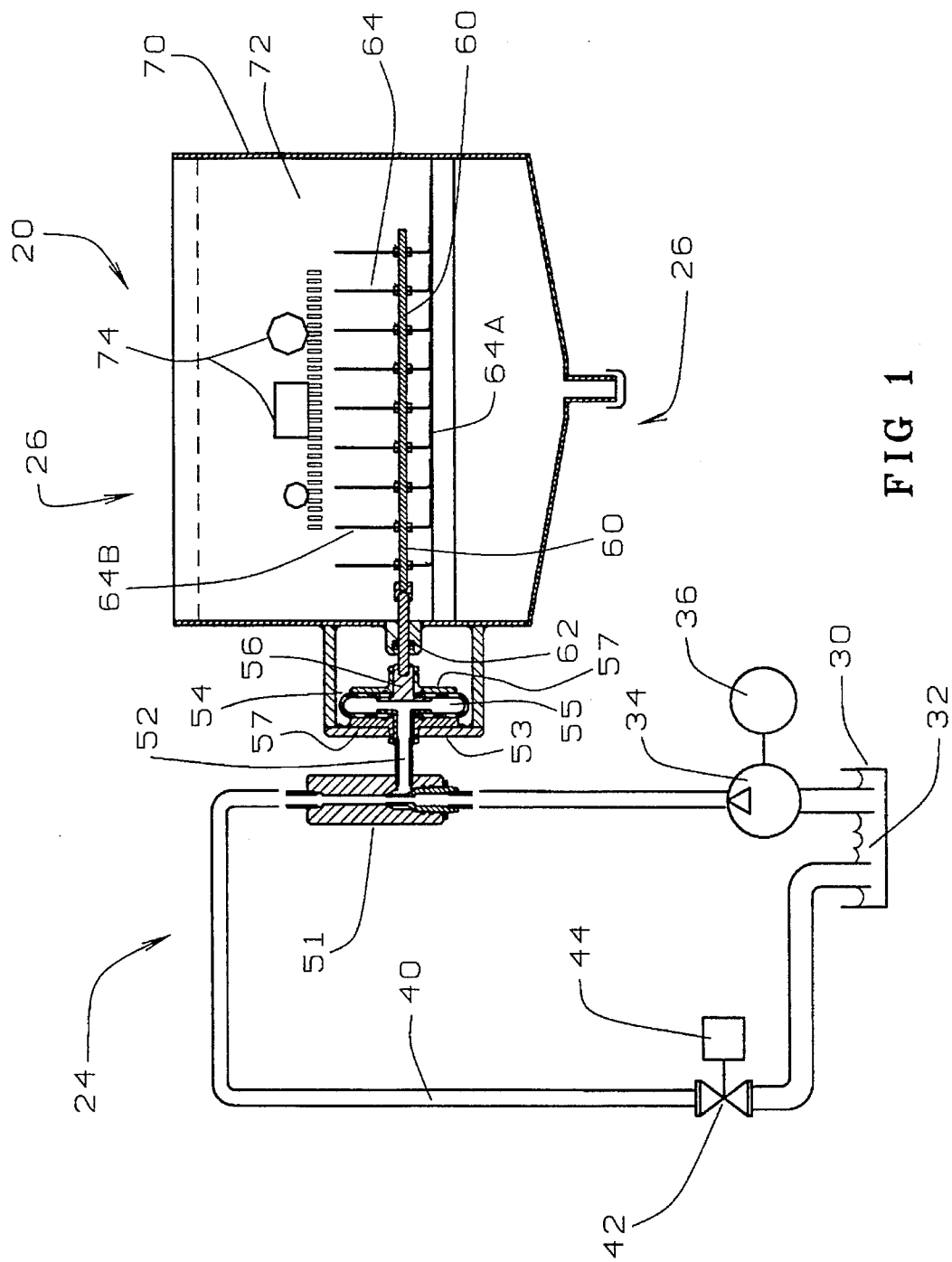
FIG. 1 is a partially cut-away schematic view of a system according to the invention for agitating a fluid.

FIG. 1 shows a liquid agitation device 20 which incorporates apparatus according to the invention for shaking fluid agitation fins 64 to agitate and stir a liquid 72. Agitation device 20 comprises a hydraulic driving system 24 which drives an agitator 26. Agitator 26 may include a tank 70 containing a fluid 72 which may, for example, be a cleaning fluid. Hydraulic driving system 24 produces a continuous series of high pressure pulses by deliberately creating a series of water hammers in a conduit 40. Hydraulic driving system 24 comprises a reservoir 30 containing a working fluid 32. Working fluid 32 may be, for example, hydraulic fluid or water. Working fluid 32 is preferably substantially incompressible and has a high cavitation threshold. Working fluid 32 is pumped through conduit 40 by a pump 34 which is driven by a motor 36. After passing through conduit 40, working fluid 32 is returned to reservoir 30. While hydraulic driving system 24 is described herein as a closed circuit. Hydraulic system 24 could also comprise an open circuit wherein working fluid 32 is simply discharged, or diverted to some other use, after exiting conduit 40. A closed circuit is generally preferable because it avoids wasting working fluid 32.

Motor 36 may be any suitable driving means for pump 34 such as an electric motor. Pump 34 is preferably a centrifugal pump. The output pressure of pump 34 is typically in the range of 60 p.s.i. to 300 p.s.i. although it is possible to practice the invention with pressures outside of this range. The function of pump 34 and motor 36 is to provide a relatively high velocity flow of working fluid 32 through conduit 40 and valve 42. A suitable supply of flowing fluid 32 could also be obtained, for example, by gravity feed from an elevated reservoir, in which case, pump 34 and motor 36 would not be required at all.

A valve 42 is provided in conduit 40. When valve 42 is open working fluid 32 can flow through conduit 40 and through valve 42 substantially unimpeded. When valve 42 is closed it substantially blocks the flow of working fluid 32 through conduit 40. Valve 42 is operated by a suitable actuator 44 which is capable of suddenly moving valve 42 from its open state to its closed state. Valve 42 must be of a type which can be opened and closed at the desired frequency of operation of driving unit 24. For example, valve 42 may be a solenoid activated spool or needle valve, a self-actuating-valve operated by the flow of working fluid 32 or a cam-operated valve as described in my co-pending application No. 07/936,032.

As will be explained in greater detail below, agitation assembly 26 is connected to conduit 40 by a conduit 52. Conduit 52 may be connected to conduit 40 at a simple T-junction or, as shown in FIG. 1, conduit 52 may connect to conduit 40 through a venturi unit 51 in conduit 40. Venturi unit 51 increases the range of variation of fluid pressure in conduit 52 as described below.

Hydraulic driving system 24 functions as follows. With valve 42 open, pump 34 pumps working fluid 32 at a high velocity V through conduit 40. Valve 42 is then closed suddenly by actuator 44. The sudden closure of valve 42 causes a water hammer within conduit 40. In general, valve 42 need not completely block the flow of working fluid 32 in conduit 40 to create a water hammer but a more intense water hammer is created if valve 42 is closed completely and suddenly. The water hammer results in a high pressure pulse propagating upstream through conduit 40. The high pressure pulse has a pressure significantly greater than the pressures produced by pump 34. In a typical application the pressure of the water hammer pulse is in the range of 500 p.s.i. to 1500 p.s.i.

The pressure of the water hammer pressure pulse is determined by the velocity V, the compressibility of the working fluid 32, the speed at which valve 42 is closed, the degree of closure of valve 42 and the speed of sound in working fluid 42, among other factors. Under ideal circumstances, when valve 42 closes fully, the magnitude of the water hammer pressure pulse is given by:

$$P_h = \rho C_p V \quad (1)$$

where $P_h$ is the pressure of the water hammer pulse, $\rho$ is the specific density of working fluid 32, and $C_p$ is the velocity at which the water hammer pulse travels in conduit 40. By increasing the velocity V of working fluid 32 in conduit 40, making the wall of conduit 40 rigid, and closing valve 42 completely and very quickly the pressure of the water hammer pulses generated by driving system 24 may be maximized.

Actuator 44 continuously opens valve 42, retains valve 42 open for a time sufficient for working fluid 32 to attain a significant velocity through valve 42 and suddenly closes valve 42 to create a continuous series of water hammer pressure pulses within conduit 40. Actuator 44 may comprise a solenoid controlled by an electronic timer or any other known mechanism for rapidly opening and closing valve 42. Actuator 44 may, for example, comprise the hydraulic circuit shown in FIGS. 3 and 4 of my copending application No. (08/277,250) filed 3 Oct., 1994 and entitled WATER-HAMMER ACTUATED CRUSHER which is incorporated herein by reference.

At any point upstream from valve 42 the fluid pressure inside conduit 40 varies cyclically between a low pressure and a very high pressure as valve 42 opens and closes. When a high pressure water-hammer pulse travelling upstream in conduit 40 reaches venturi unit 51 the pulse propagates through venturi unit 51, through conduit 52 into agitation unit 26. Conduit 52 serves as a means for transmitting changes in a pressure in conduit 40 into agitation unit 26. Preferably conduit 40 is a rigid-walled conduit so that pressure pulses generated at valve 42 are not attenuated significantly as they propagate upstream through conduit 40.

Figure 2:
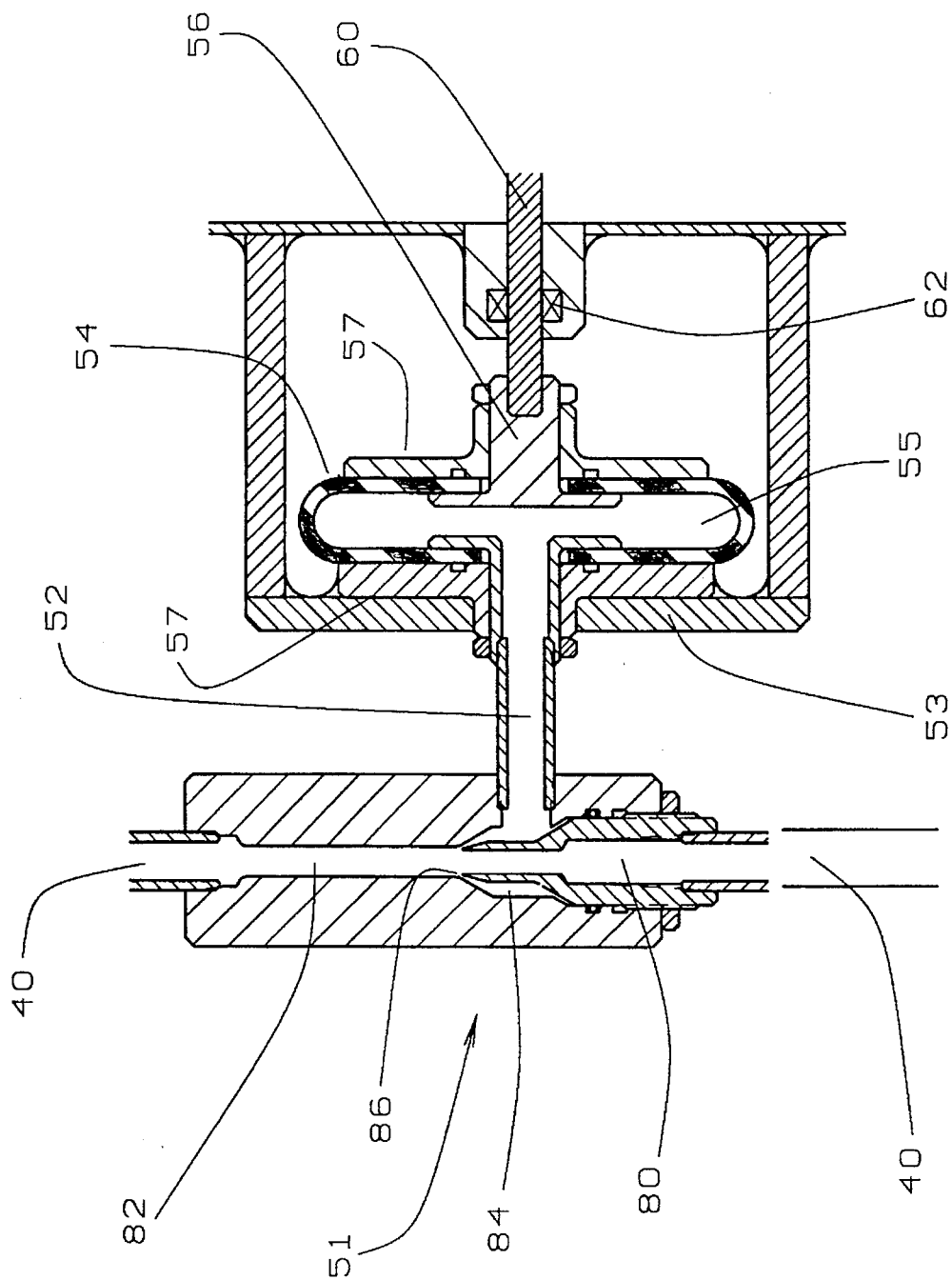
FIG. 2 is a schematic view of the actuator of the apparatus of FIG. 1.

As shown in FIG. 2, conduit 52 is connected to an actuator which comprises a flexible walled bladder 54 disposed between a pair of plates 57. Bladder 54 has an internal chamber 55. Conduit 52 connects directly to internal chamber 55. A fitting 56 is mounted to one side of Bladder 54.

Fitting 56 is coupled to a push rod 60 which extends through a suitable packing 62 into tank 70 which is filled with a fluid 72 which may be, for example, a cleaning fluid. The actuator assembly is mounted to tank 70 by a frame 53. When a high pressure acoustic pulse propagates up conduit 52 into chamber 55 it causes bladder 54 to bulge outwardly. This exerts a sudden push on rod 60.

Bladder 54 may be an expandable steel bellows or may have a wall comprising a reinforced rubberized material, as shown. As the pressure within chamber 55 changes as a result of the periodic water hammer pulses generated in conduit 40 the force exerted on plates 57 and rod 60 by bladder 54 varies and rod 60 vibrates longitudinally.

As shown in FIG. 1, one or more fins 64 are inside tank 70. Rod 60 passes through apertures in fins 64. Fins 64 each have a fixed end 64A which is mounted to a fixed member inside tank 70 by suitable means such as bolting or welding. Each fin 64 also has a free end 64B. Fins 64 are prevented from sliding longitudinally on rod 60 by bolts or other suitable projections from rod 60 on either side of each fin 64.

Each time rod 60 is pushed by a water hammer pulse propagating into chamber 55 of bladder 54, rod 60 pushes on and displaces fins 64. This sets fins 64 vibrating. The vibrating fins 64 agitate fluid 72. The agitated fluid may be used, for example, to clean objects 74 which are replaced in fluid 72 within tank 70.

Fins 64 are preferably springy so that once set into motion they continue to oscillate. Fins 64 are preferably constructed from sheets of spring steel or a similar stiff spring material. Thus, each water hammer pressure pulse created by hydraulic driving system 24 sets fins 64 into vibration which continues even after the pressure pulse has passed.

Venturi unit 51 is provided to increase the range of motion of rod 60 over the range of motion which would result if conduit 52 were connected directly to conduit 40. Venturi unit 51 comprises a nozzle 80 which is connected to a section of conduit 40 leading to pump 34. Nozzle 80 directs a stream of working fluid 32 into a narrowed section 82. An annular region 84 within the body of venturi unit 51 surrounds the end of nozzle 80. Annular region 84 is connected to narrowed section 82 through a thin annular aperture 86. When fluid is flowing at velocity through conduit 40 then the flow of fluid through nozzle 80 tends to draw fluid through annular space 86 from annular region 84. This, in turn, tends to reduce the pressure within annular region 84, conduit 52 and chamber 55. Venturi unit 51 therefore functions as an aspirator or "jet pump".

The reduction of pressure in chamber 55 tends to contract bladder 54 so that rod 60 is drawn toward bladder 54. When a hydraulic pressure pulse is created by closing valve 42 downstream from venturi unit 51 the pressure pulse propagates upward through conduit 40, through narrow section 82 and into annular region 84. The sudden increase of pressure propagates through conduit 52 and into chamber 55 where it expands bladder 54, thus pushing rod 60.

After a water hammer pressure pulse passes the springy nature of fins 64 tends to return rod 60 to its equilibrium position.

Figure 3:
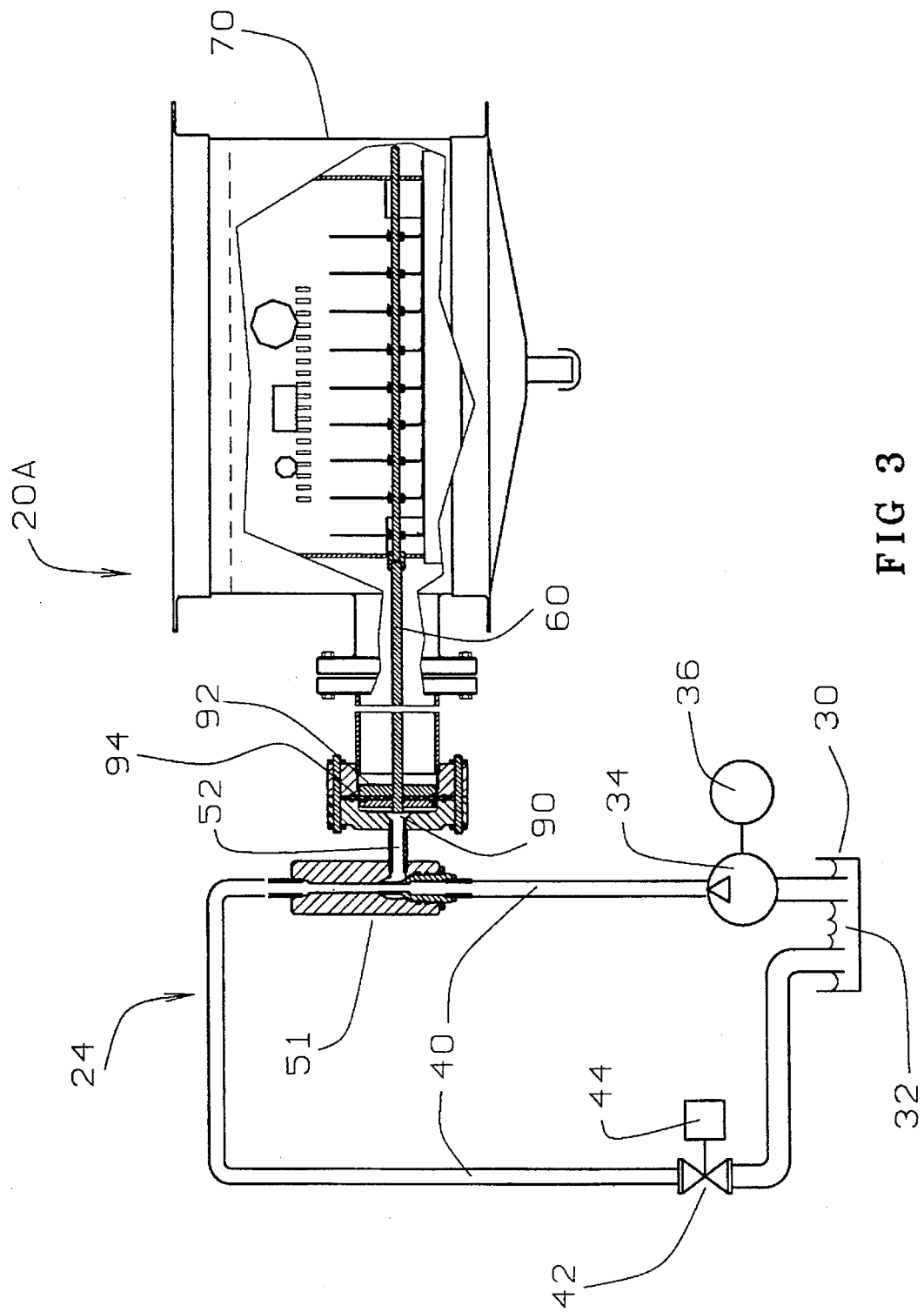
FIG. 3 is a partially cut-away schematic view of a first alternative embodiment of liquid agitator according to the invention.
Figure 4:
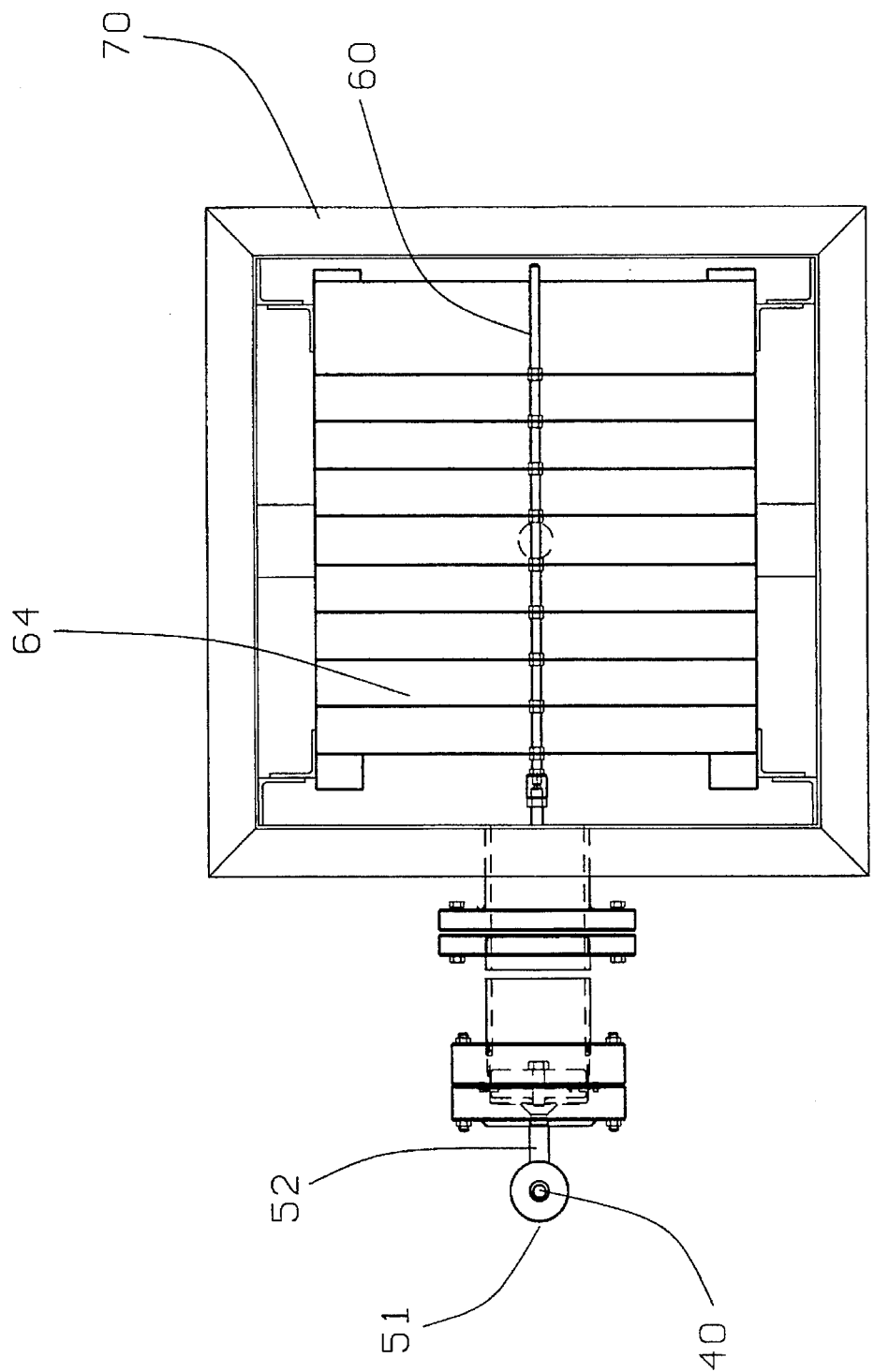
FIG. 4 is a top-plan view of the agitator portion of the apparatus of FIG. 3.
Figure 5:
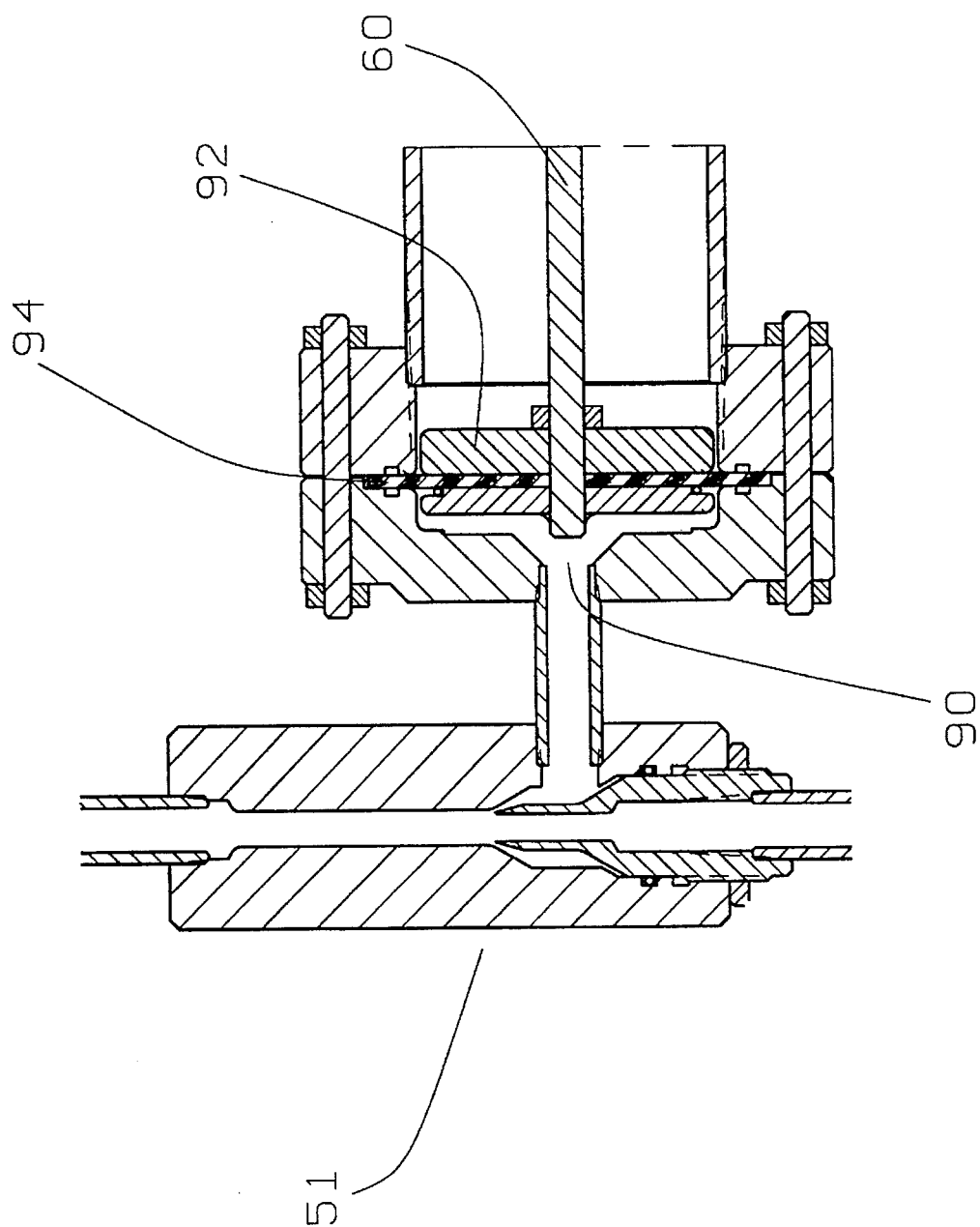
FIG. 5 is a sectional view through the actuator portion of the apparatus of FIG. 3.

FIGS. 3, 4 and 5 show a liquid agitator 20A according to an alternative embodiment to the invention. In FIG. 3 rod 60 is actuated by a slidable piston 92 which forms one wall of a chamber 90 to which conduit 52 is connected. Piston 92 may have sliding seals which bear against the walls of chamber 90 or, as shown, may be associated with a flexible diaphragm 94 which seals chamber 90 while allowing some motion of piston 92. Liquid agitator 20A functions in a manner analogous to liquid agitator 20 described above with the exception that high pressure pulses propagating through conduit 52 apply force to rod 60 via a piston 92 instead of a bladder 54 between plates 57.

The embodiment of FIG. 3 has the advantage that the energy of each water hammer pressure pulse is transferred into longitudinal motion of rod 60 without losses that occur when bladder 54 stretches. On the other hand, the embodiment of FIG. 3 requires precision machining of piston 92 and chamber 90 which is expensive.

Figure 6:
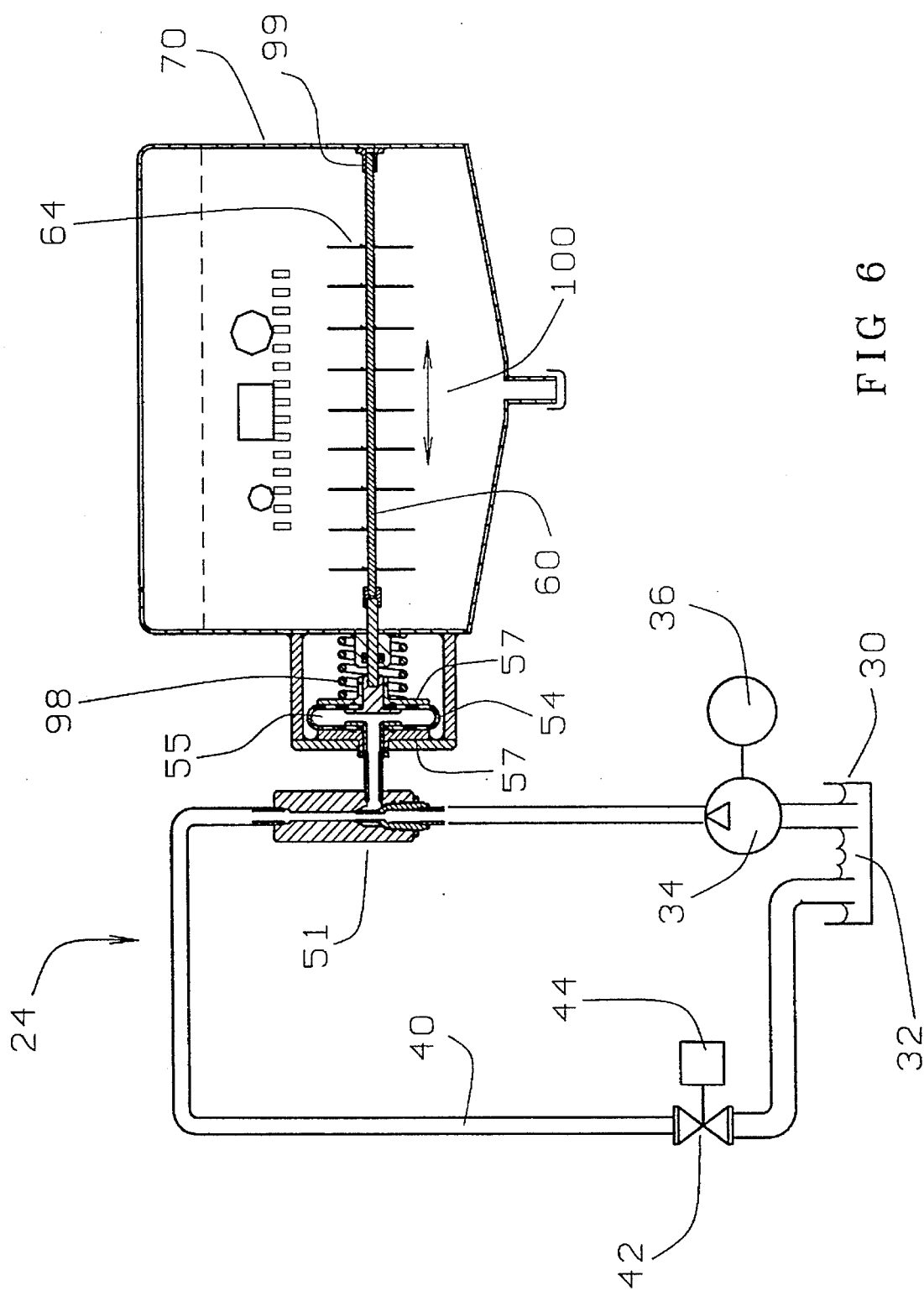
FIG. 6 is a schematic view of a second alternative embodiment of the apparatus of FIG. 1.

In the embodiments of the invention described above rod 60 has been attached to spring-like fins which tend to return rod 60 to an equilibrium position. FIG. 6 shows an embodiment of the invention in which fins 64 are attached directly to rod 60 and are not otherwise attached to tank 70. The end of rod 60 away from actuating bladder 54 is slidably mounted in a fitting 99 which allows rod 60 to oscillate longitudinally, as indicated by arrow 100.

Compression spring 98 is provided to help to return bladder 54 to its normal configuration after each high pressure pulse passes. When a high pressure pulse is delivered to cavity 55, bladder 54 expands against the bias provided by spring 98. This pushes rod 60 away from bladder 54. After the high pressure pulse has passed spring 98 compresses bladder 54 and pulls rod 60 towards bladder 54. The suction produced by venturi unit 51 also helps to retract rod 60.

Figure 7:
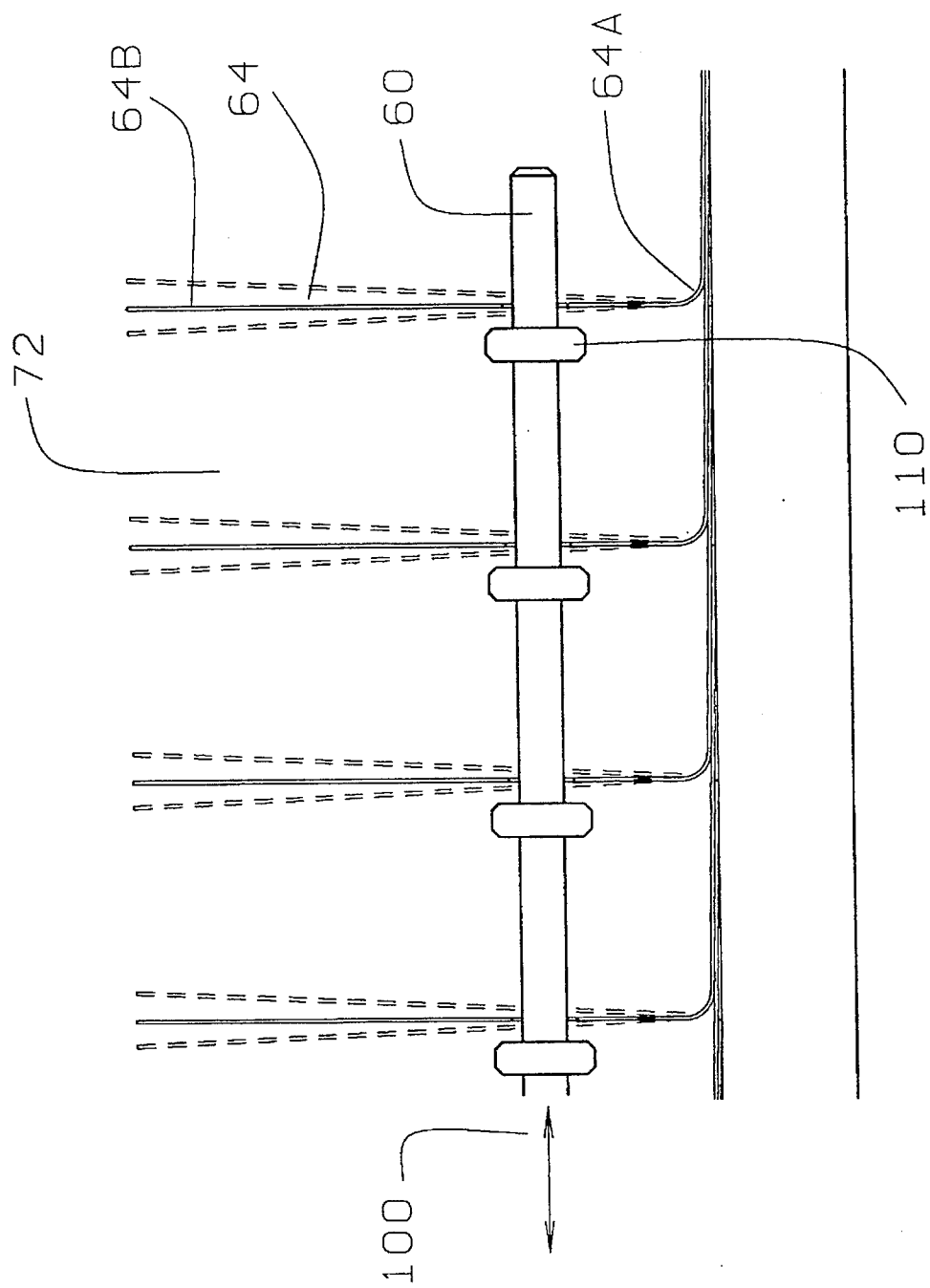
FIG. 7 is a sectional view through an alternative arrangement for driving fins for agitating a liquid which may be used with the apparatus of FIG. 1.

FIG. 7 shows an alternative arrangement for imparting motion to fins 64 in which fins 64 can move relative to rod 60. The arrangement of FIG. 7 may be used with the apparatus of FIG. 6. As shown in FIG. 7, rod 60 passes through apertures in fins 64. Fins 64 are springy and are affixed at their ends 64A to a member within tank 70. When rod 60 is suddenly driven away from bladder 54 by a water hammer pressure pulse then flanges 110 on rod 60 hammer against fins 64 and push fins 64 away from their equilibrium positions. When the pressure pulse passes, and rod 60 is retracted by spring 98, fins 64 continue to vibrate at their own resonant frequencies as shown in dotted outline.

Figures 8, 9:
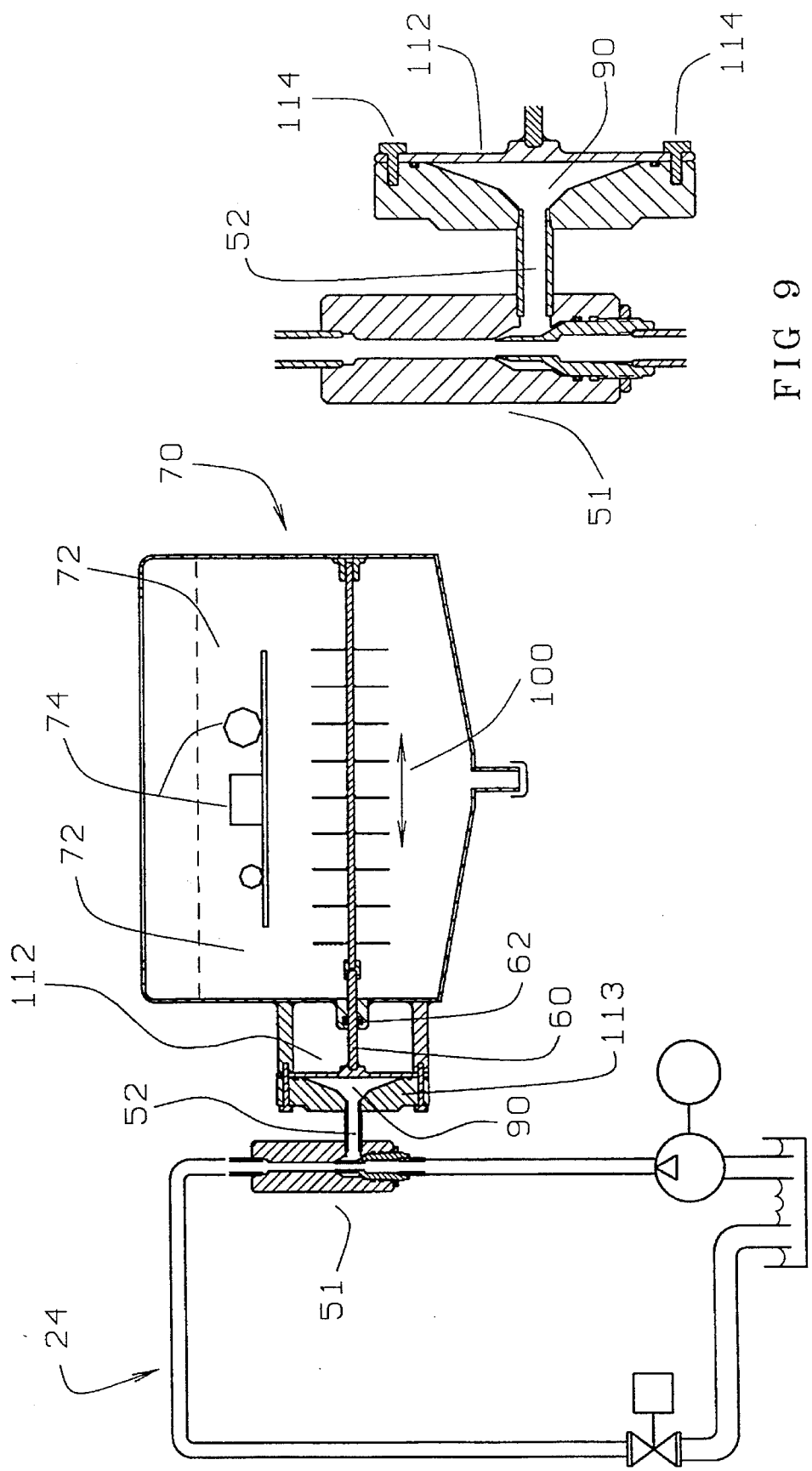
FIG. 8 is a schematic view of a third alternative embodiment of the apparatus of FIG. 1.
FIG. 9 is section through an actuator mechanism for the apparatus of FIG. 8.

FIG. 8 shows another embodiment of the invention in which the driven end of rod 60 is attached at the centre of a springy diaphragm 112. Diaphragm 112 is, for example, a sheet of spring steel material. Diaphragm 112 forms a portion of the wall of a cavity 90 in a body 113. Diaphragm 112 is sealed to body 113 with a standard seal, such as an O-ring or a gasket. When a pressure pulse is delivered through conduit 52 into cavity 90 the pressure inside cavity 90 causes diaphragm 112 to bulge outwardly away from cavity 90, thus pushing rod 60 away from cavity 90. After the pressure pulse passes diaphragm 112 snaps back towards its equilibrium position, pulling rod 60 with it. The repeated application of high pressure pulses to cavity 90 causes rod 60 to oscillate as shown by arrow 100.

Diaphragm 112 is preferably spring-like and is free to vibrate so that after a pressure pulse has been applied and passes away diaphragm 112 continues to oscillate, thus imparting a high frequency longitudinal vibration to rod 60 which is superimposed upon the larger amplitude vibrations which occur with at the frequency of operation of driving system 24. Diaphragm 112, should be thin enough to move as described above but thick enough to withstand the stress which occurs when the fluid pressure in chamber 90 is at the pressure of a water hammer pulse.

Venturi unit 51 functions as described above to increase the magnitude of the changes in pressure in chamber 90 and, therefore, the amplitude of oscillation of rod 60. As shown in FIG. 9, diaphragm 112 may be secured to body 118 by bolts 114.

Figure 10:
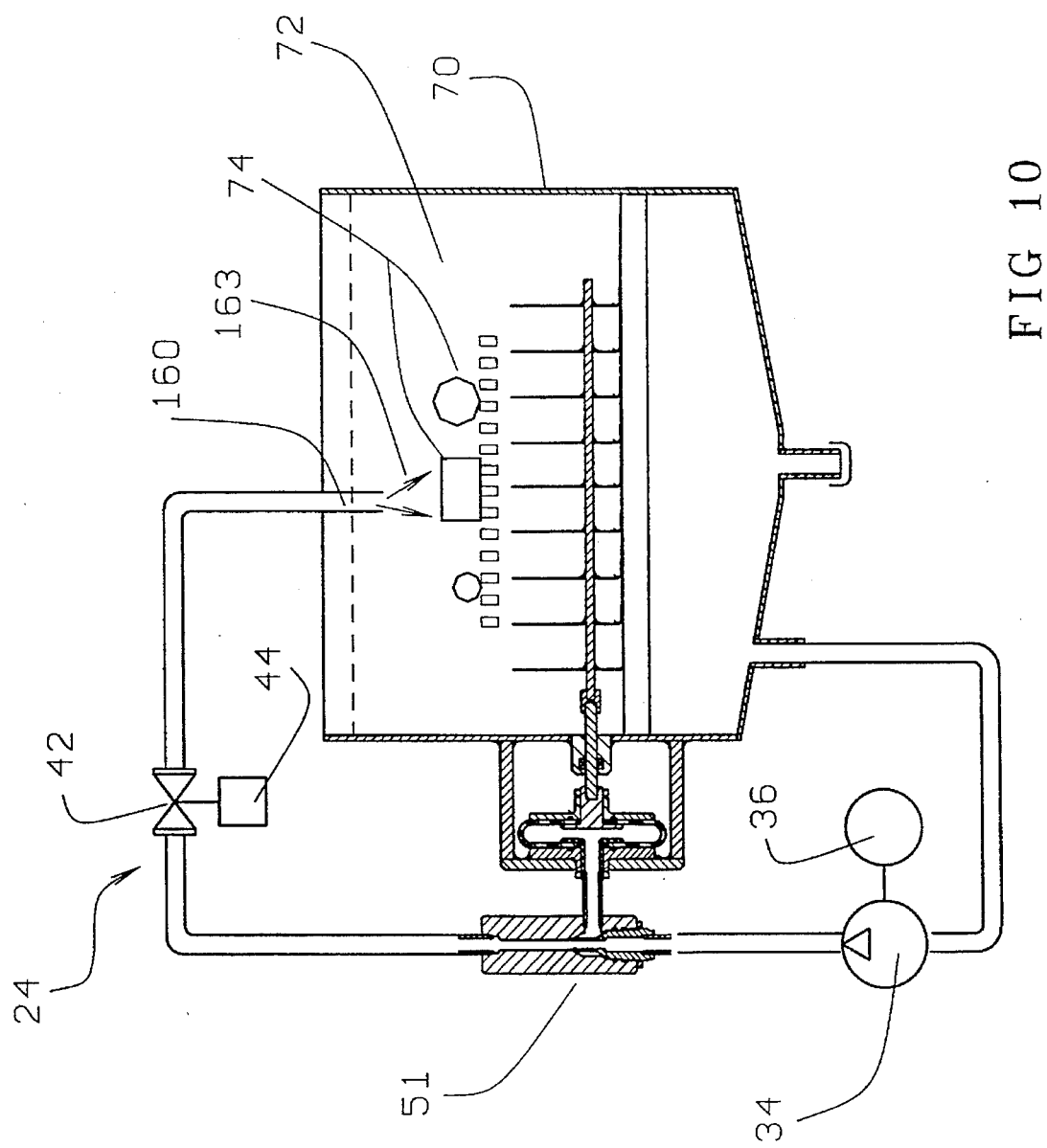
FIG. 10 is an alternative embodiment of a liquid agitation apparatus according to the invention.

FIG. 10 shows an alternative liquid agitator according to the invention in which fluid 72 from tank 70 is used as a working fluid for hydraulic driving system 24. Tank 70 serves the function of tank 80, which is shown in FIG. 1. In this embodiment of the invention, the stream of fluid exiting conduit 40 downstream from valve 42 may be used additionally to agitate the fluid within tank 70 and to provide a high pressure pulsating stream of fluid 72 which can be directed at object 74, such as parts being cleaned, as indicated by arrows 168. End 160 of conduit 40 is preferably mounted so that it can be moved to direct pulsating fluid 168 toward objects 74 from various directions. Pulsating fluid jet 163 is useful, for example, in dislodging particles which are adhering to one of objects 74.

Figure 11:
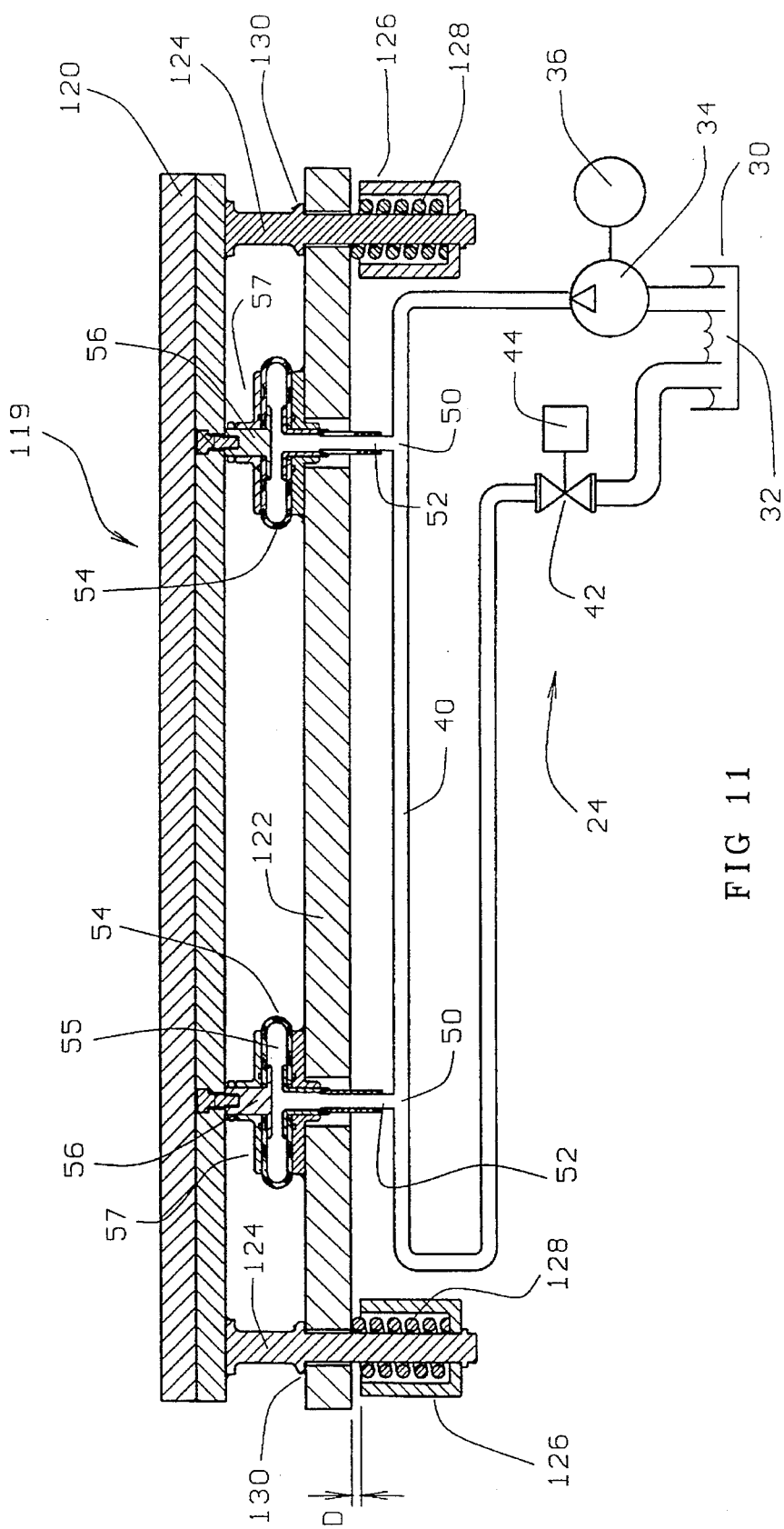
FIG. 11 is a sectional schematic view through a shaker table according to the invention.

FIG. 11 shows a shaker table which is vibrated by apparatus according to the invention. Hydraulic driving system 24 functions as described above. Shaker table 119 comprises a table 120 which is supported above a base 122 by rods 124 which pass through apertures in base 122. Rods 124 have flanges 130 which support table 120 above sub-frame 122.

An actuator assembly comprising one or more bladders 54 is provided between table 120 and sub-frame 122. One side of each bladder 54 bears against the underside of table 120. Preferably, each bladder 54 is attached to the underside of table 120 by a fixture 56 attached to bladder 54 and table 120. A second side of each bladder 54 is attached to sub-frame 122. Conduits 52 extend from T-junctions in conduit 40 to cavities 55 within bladders 54. High pressure pulses are periodically developed by creating water hammer within conduit 40 as described above. These high pressure pulses propagate along conduit 40 to T-junctions 50 and into bladders 54. When a high pressure pulse reaches a bladder 54 it pushes bladder 54 outwardly, thus exerting a great force between table 120 and sub-frame 122. This force lifts table 120.

Upward motion of table 120 is limited by caps 126 which are mounted to rods 124 on the side of sub-frame 122 opposite table 120. When flanges 130 are resting on base 122 a gap, indicated by the distance D, is left between the edges of caps 126 and the face of base 122. Thus table 120 is constrained so that it cannot move vertically farther than the distance D. It is desirable to limit the travel of table 120 to limit the amount of liquid which flows into and out of each bladder 54 during each cycle. If too much liquid flows into one of bladders 54 then pressure pulses travelling upstream in conduit 40 will become highly attenuated before they can travel upstream to other bladders 54.

Compressional springs 128 extend between base 122 and the inner-faces of caps 126 to bias table 120 toward base 122. When a high pressure pulse expands bladders 54 table 120 is forced away from base 122. When the high pressure pulse has passed springs 128, aided by gravity, cause table 120 to fall down until flanges 130 contact sub-frame 122. A continuous series of water hammer pressure pulses in conduit 40 causes shaker table 120 to shake.

Figure 12:
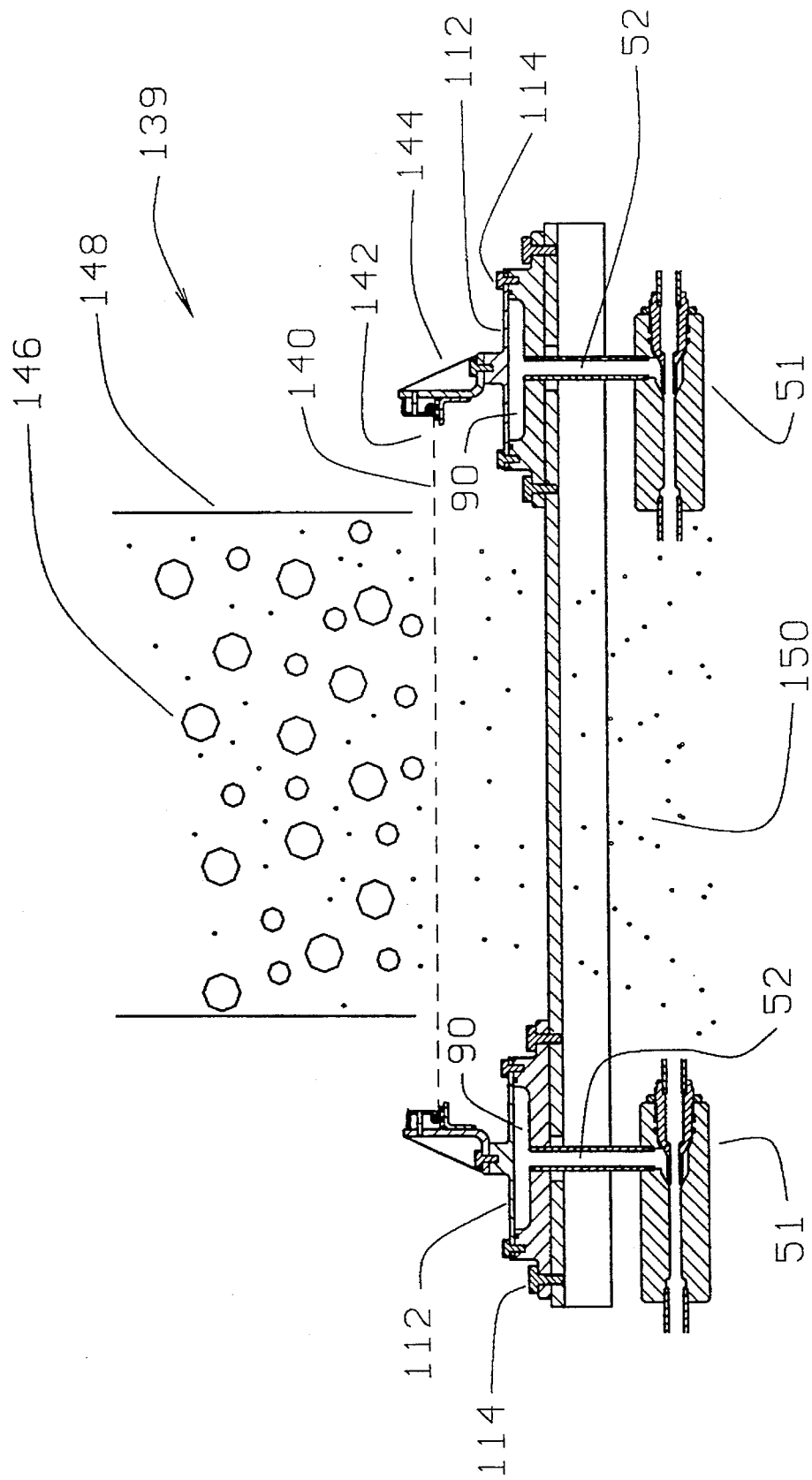
FIG. 12 is a schematic view of a transverse section through a shaking screen according to the invention.
Figure 13:
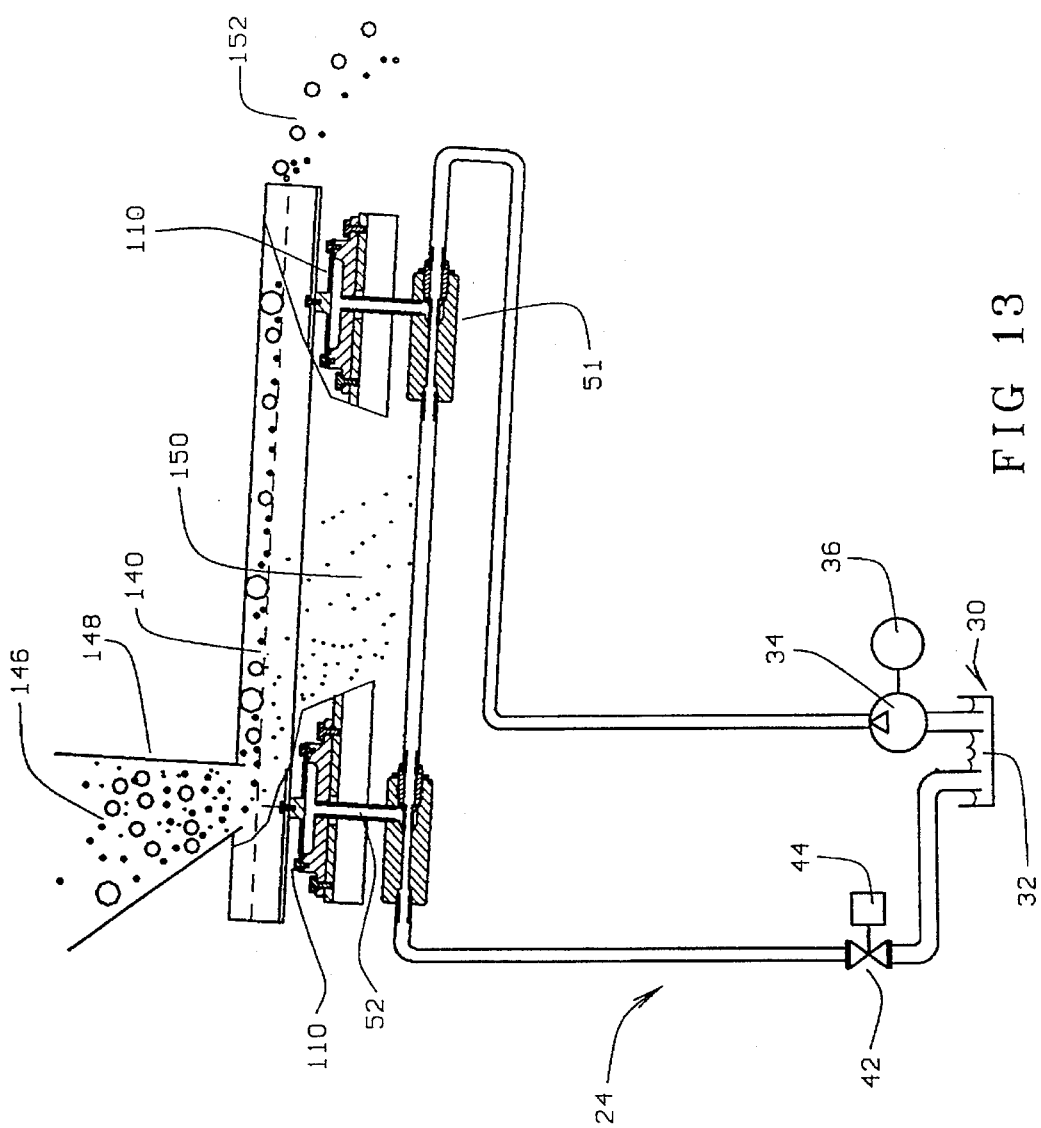
FIG. 13 is a schematic, partially cut-away side elevational view of the shaking screen of FIG. 12.

FIGS. 12 and 13 show a screen assembly 139 which is vibrated according to apparatus according to the invention. Screen assembly 139 may be used, for example, to separate fine gravel from a quantity of crushed rock. A mixture 146 of particles of various size is delivered from a hopper 148 onto a mesh 140. Mesh 140 is shaken to help smaller particles 150 to fall through mesh 140, where they can be collected. Mesh 140 is mounted to a frame 144 by clamps 142. Frame 144 is, in turn, mounted atop vibration assemblies comprising springy, flexible diaphragms 112 which form one wall of cavities 90 which are connected to a hydraulic driving system 24 as described above with reference to FIG. 8. High pressure pulses produced by hydraulic driving system 24 cause diaphragms 112 to oscillate. This, in turn, shakes frame 114 and mesh 140.

Figure 14:
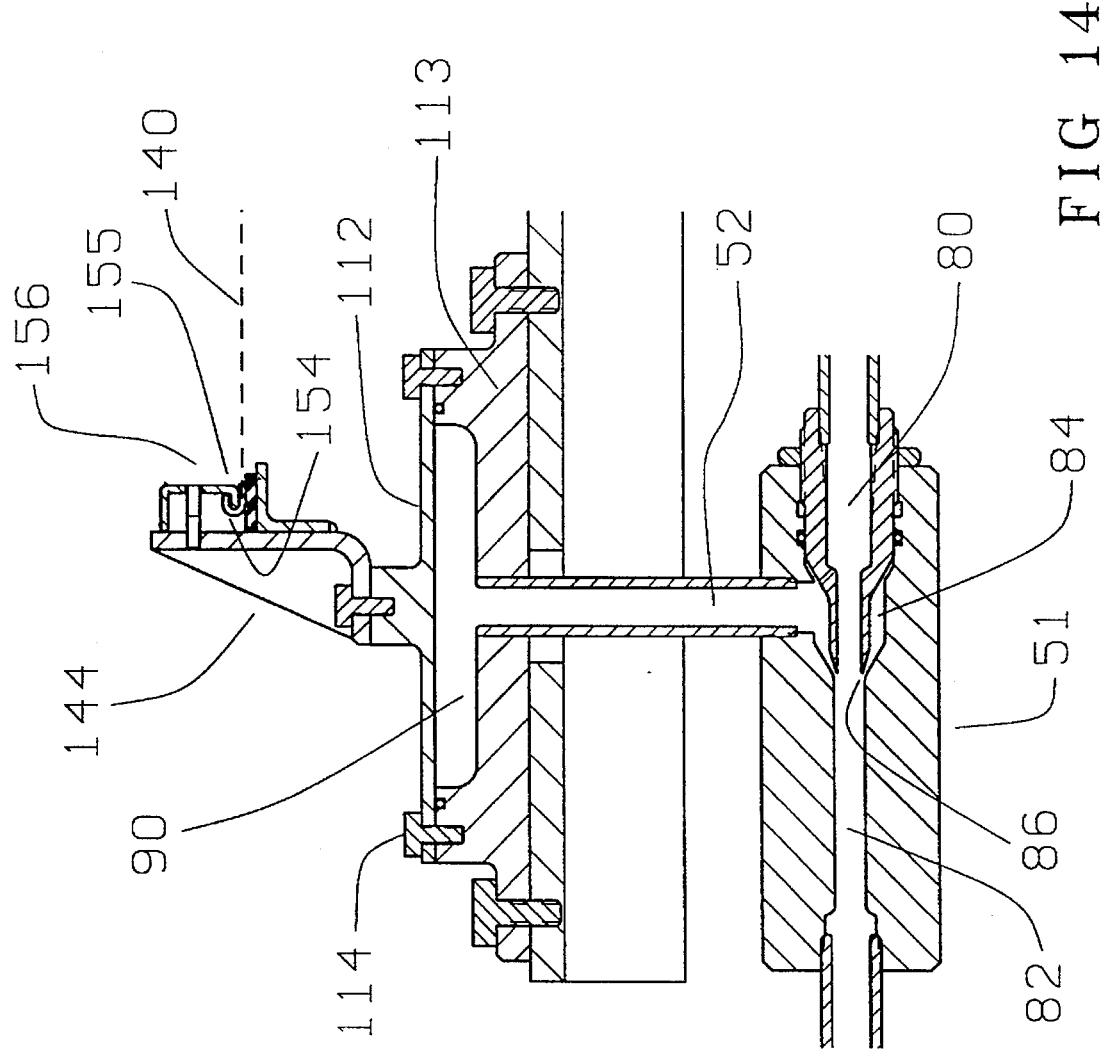
FIG. 14 is a sectional view through one portion of the actuator mechanism of the shaking screen in FIG. 11.

As shown in FIG. 14, clamping mechanism 142 may comprise a hook 154 mounted on the edge of mesh 140. Hook 154 is engaged by a clamping bar 155 which may be tightened by a bolt 156.

Figure 15:
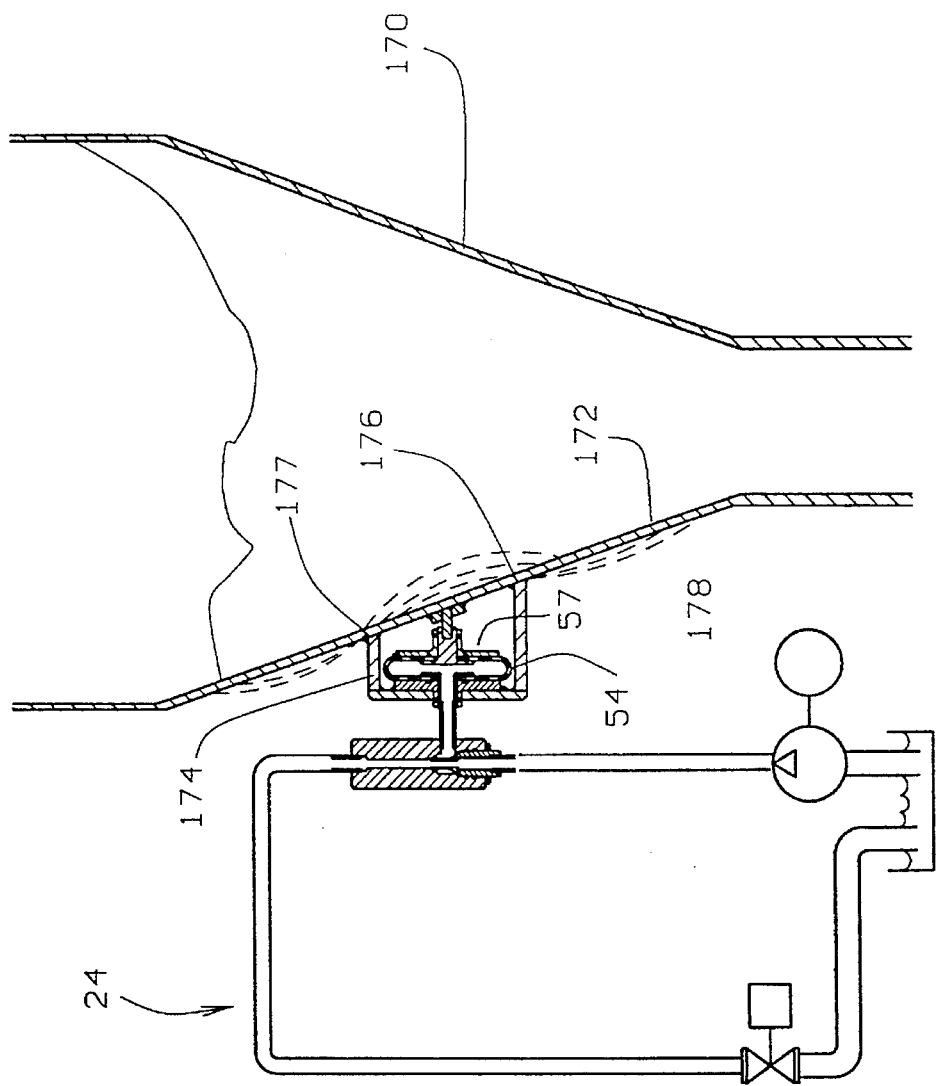
FIG. 15 is a schematic sectional view through a hopper equipped with a vibrator according to the invention.

FIG. 15 shows an alternative embodiment to the invention in which a hydraulic driving system 24 is used in conjunction with an actuator to vibrate a wall 172 of a bin 170. Bladder 54 is connected between a frame 174 and a point 178 on wall 172. Frame 174 is attached to wall 172 at two points 176, 177 which are, preferably, equally spaced on either side of point 178. When a high pressure pulse is delivered to the chamber 55 inside bladder 54 by hydraulic driving system 24 bladder 54 pushes on wall 172 and displaces it inwardly as shown in dotted outline in FIG. 15. Portions of wall 172 above and below points 176 and 177 are distorted slightly outwardly. The continued application of high pressure pulses to bladder 54 causes wall 172 to vibrate, thus shaking the contents of hopper 170.

FIGS. 16–26 relate to embodiments of the invention wherein shaking is transmitted to a structure in contact with an elongated duct which, in these exemplary embodiments, is a section of reinforced hydraulic hose. A hydraulic driving system 24, as described above, provides a continuous series of high pressure water hammer generated pulses to the interior of the duct.

Figure 16:
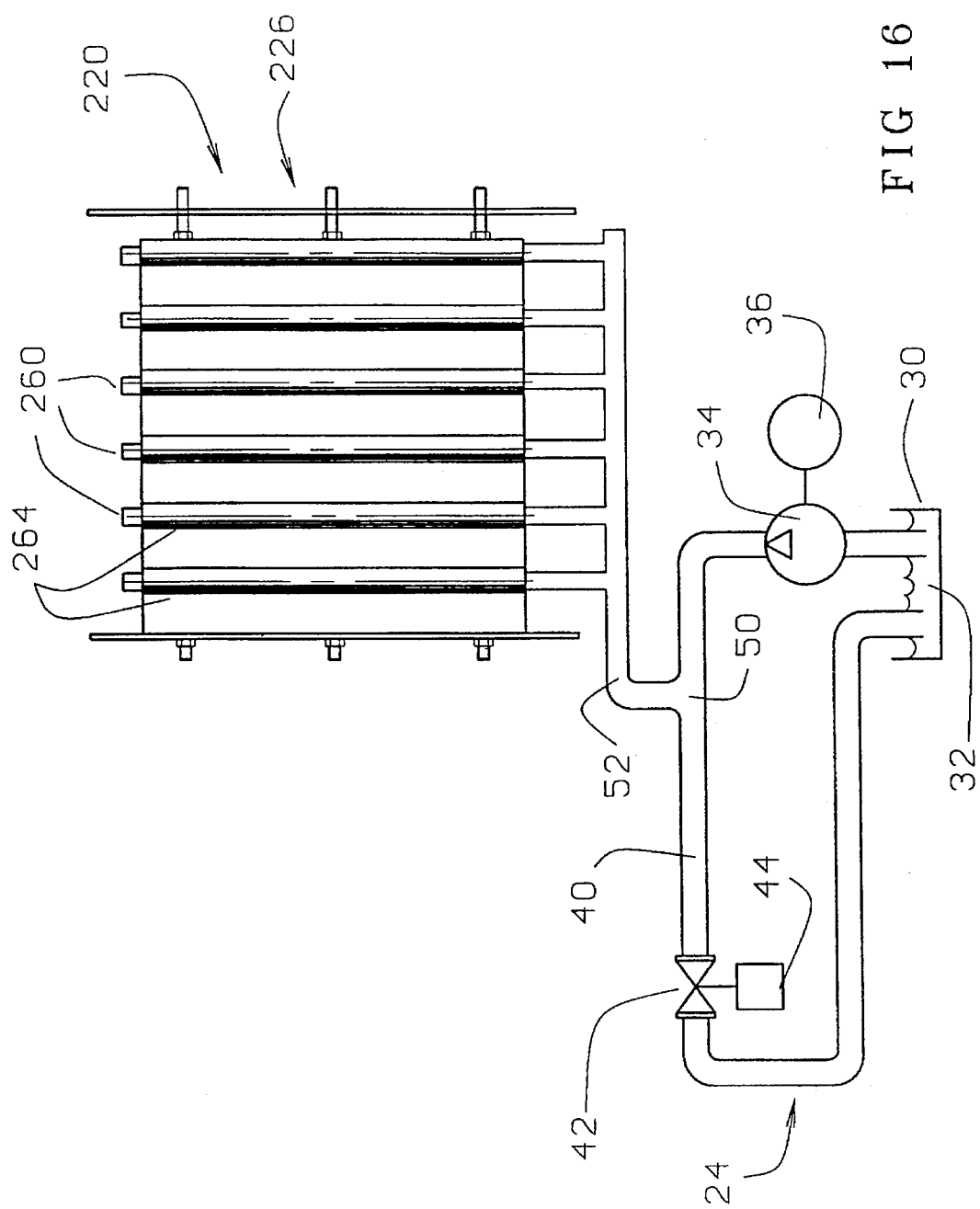
FIG. 16 is a schematic view of a system for agitating a liquid, according to a fourth alternative embodiment of the invention.

FIG. 16 shows apparatus 220 for agitating a liquid. Apparatus 220 comprises hydraulic driving system 24, which functions as described above, and an agitator assembly 226. Agitator assembly 226 is connected to conduit 40 at a T-junction 50. When high pressure pulses caused by the closure of valve 42 reach T-junction 50, the high pressure pulses propagate into agitator assembly 26 through conduit 52. The high pressure pulses also continue to propagate along conduit 40 toward pump 34.

Agitator assembly 226 comprises a plurality of elongated hoses 260. Each of hoses 260 has an end connected to conduit 52 and a closed end. Hoses 260 are preferably high pressure hydraulic hoses reinforced with steal or Kevlar, such as the hoses distributed by Green Line Hose and Fittings of 1521 Venables Street, Vancouver B.C. under the trade-marks PULSAR G111T and PULSAR G122T. The diameter of hoses 260 will depend upon the particular application. Hoses 260 should have a cross sectional area no greater than that of conduit 40. High pressure pulses travelling upstream in conduit 52 travel into each of hoses 260. The high pressure pulses act upon the walls of hoses 260 and suddenly stretch hoses 260 outwardly until the reinforced walls of hoses 260 prevent hoses 260 from expanding further.

Figure 18:
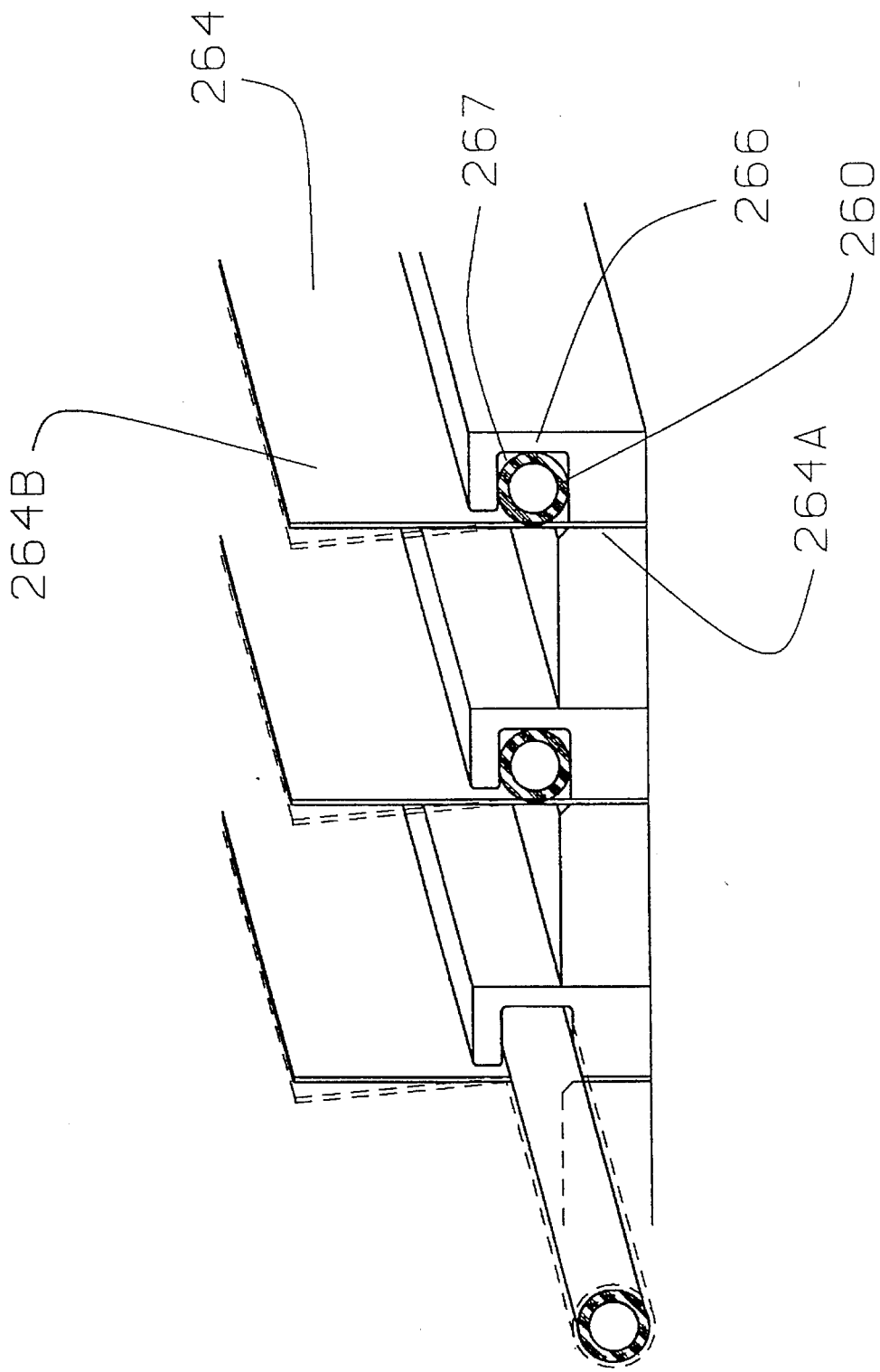
FIG. 18 is a cut-away perspective view through the agitator of the system shown in FIG. 17.

As shown in FIG. 18, hoses 260 are disposed in agitator assembly 226 within channels 267 in elongated channel members 266. The walls of hoses 260 are supported by the walls of channels 267 so that, when a high pressure pulse expands hose 260, hose 260 expands outwardly from channel 267.

Flexible resilient agitator fins 264 extend across the open sides of channels 267 in contact with the outer walls of hoses 260. When the liquid inside hoses 260 is at a low pressure, the outer walls of hoses 260 are preferably in gentle contact with fins 264 and the walls of channels 267. Agitator fins 264 are anchored along one edge 264A and are free along a second edge 264B. Agitator fins 264 are preferably made of sheets of spring steel or a similar flexible, stiff springy material so that, when struck, they will continue to vibrate from side to side.

In operation, each of the high pressure pulses which are periodically delivered into hoses 260 causes hoses 260 to suddenly expand. As hoses 260 expand they push on the sides of fins 264 and set fins 264 into oscillation. Hydraulic driving circuit 24 provides a continuous stream of high pressure pulses to hoses 260 so that fins 264 vibrate continuously.

Figure 19:
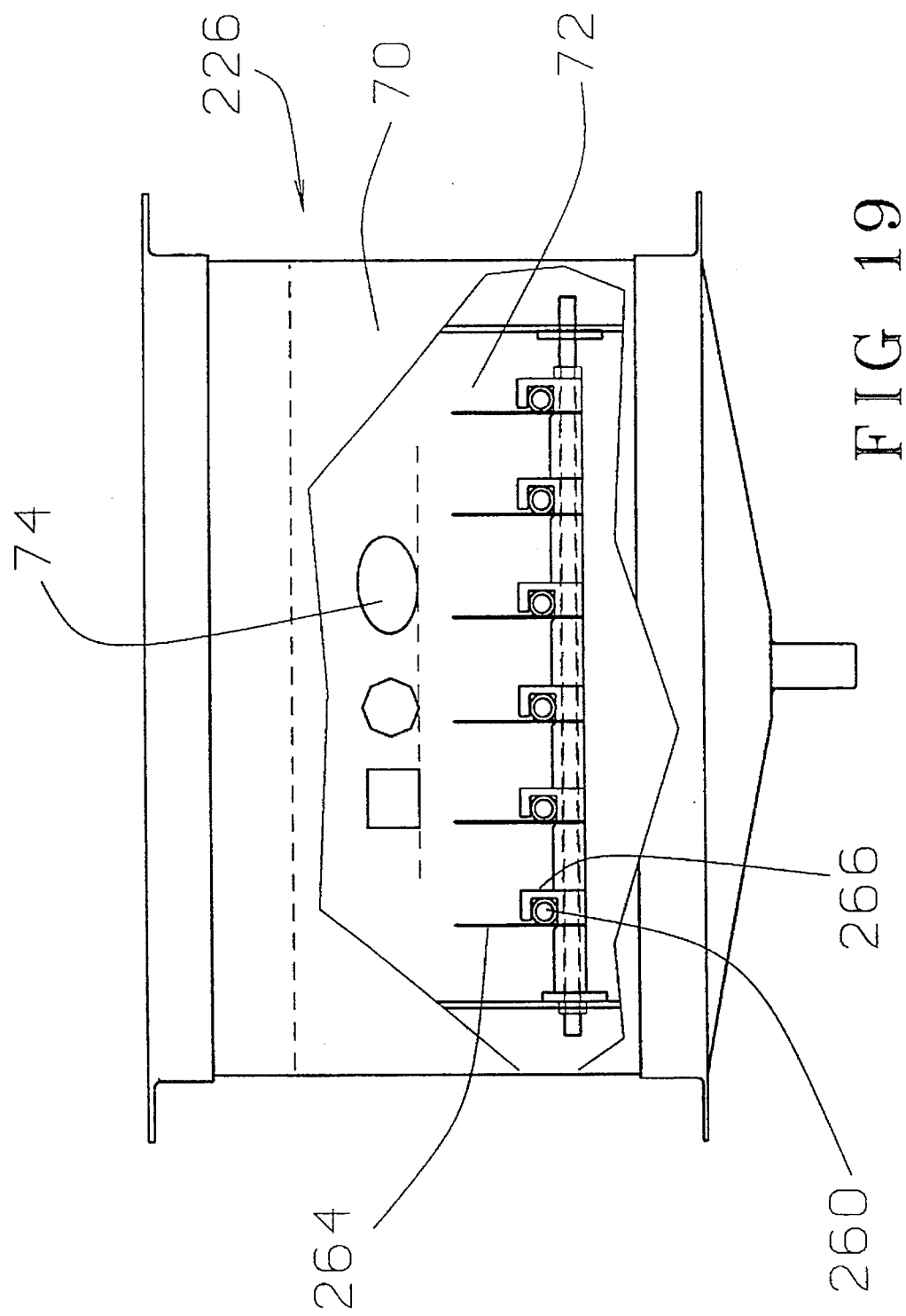
FIG. 19 is a partially cut-away side elevation of the agitator of the system shown in FIG. 17.

FIG. 19 shows an agitator assembly 226 which includes a tank 70 for containing a fluid 72. Fins 264 agitate fluid 72. The agitated fluid acts on objects 74 inside tank 70. For example, fluid 72 may be a solvent or other suitable cleaning fluid and object 74 may be parts, such as car parts which can be cleaned by placing them in the agitated solvent.

Figure 17:
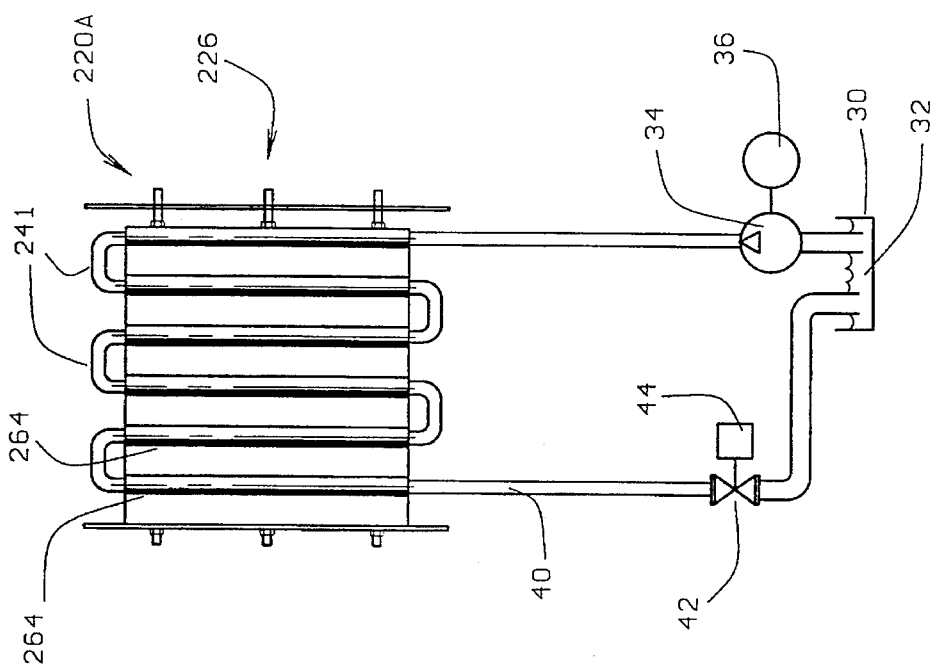
FIG. 17 is a fifth alternative system according to the invention for agitating a liquid.

FIG. 17 shows an alternative embodiment of the invention in which agitator fins 264 are in contact with a section of hose 241 which is inserted in conduit 40 upstream from valve 42. High pressure pulses travelling up conduit 40 travel directly into hose 241. Hose 241 acts on fins 264 in a manner identical to the way that hoses 260 act on fins 264 in the apparatus of FIG. 16. The embodiment of FIG. 17 has the advantage that there is no opportunity for pressure pulses travelling upstream from valve 42 to become attenuated by passing through a T-joint 50, as is the case for the embodiment shown in FIG. 16.

Figure 20:
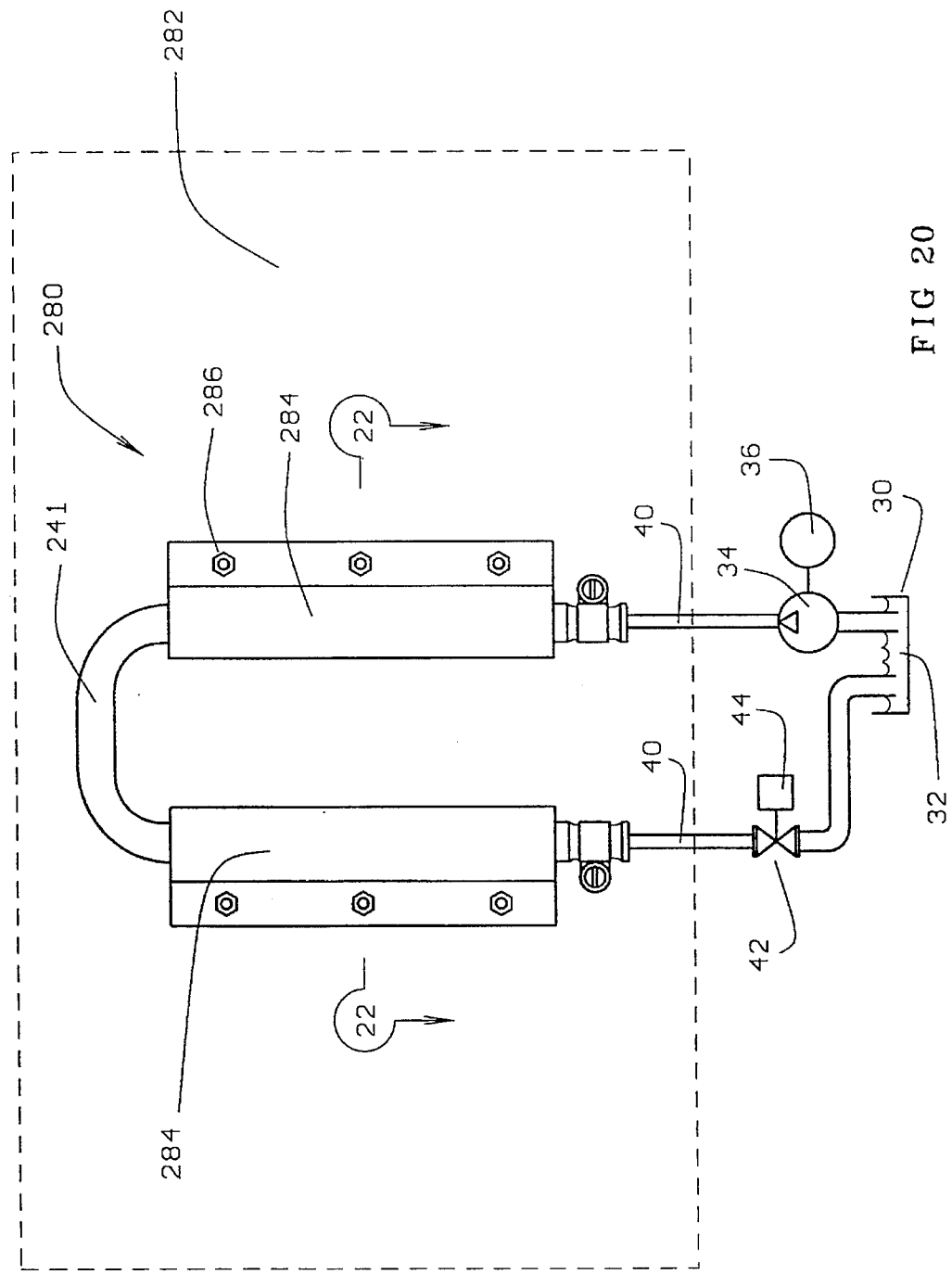
FIG. 20 is an elevational section through a hopper equipped with a shaking apparatus according to the invention.

FIG. 20 shows a shaking apparatus 280 adapted to vibrate a wall, 282, such as the wall of a bin or a hopper. Shaking apparatus 280 comprises a hydraulic circuit essentially identical to the hydraulic circuit shown in FIG. 17. Working fluid 82 is pumped through conduit 40 and reinforced hose 241. Reinforced hose 241 is held in contact with wall 282 by one or more channel members 284. Channel members 284 may be affixed to wall 282 by any suitable means such as by bolts 286 or by welding.

Figure 21:
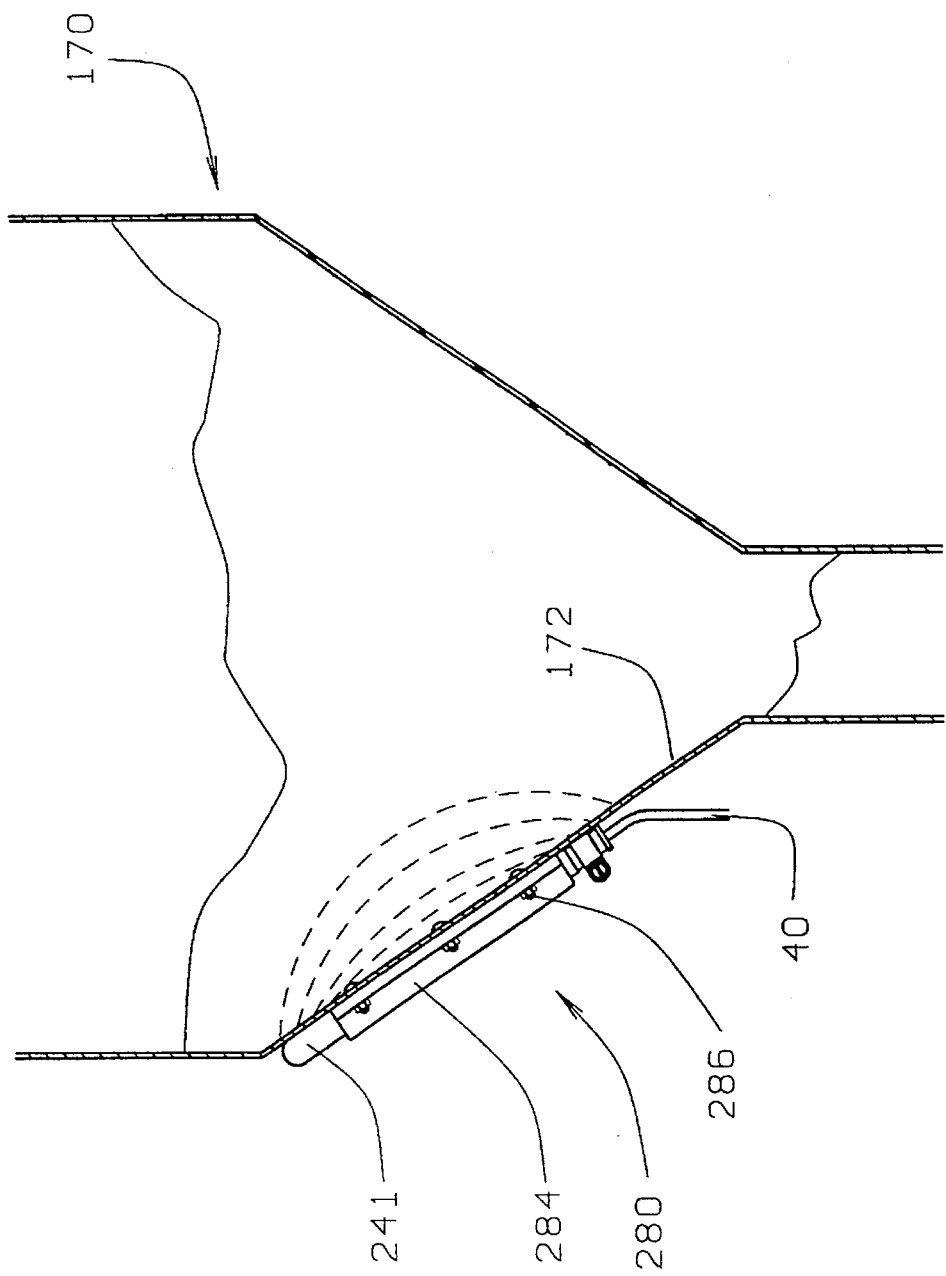
FIG. 21 is a partially schematic front elevation of the shaker shown in FIG. 20.

As shown in FIG. 21, shaking assembly 280 may be mounted to the wall 172 of a hopper 170 for shaking the contents of the hopper, for example, to prevent granular substances from "bridging" in the hopper and to promote the smooth flow of the granular substances out of hopper 170.

Figure 22:
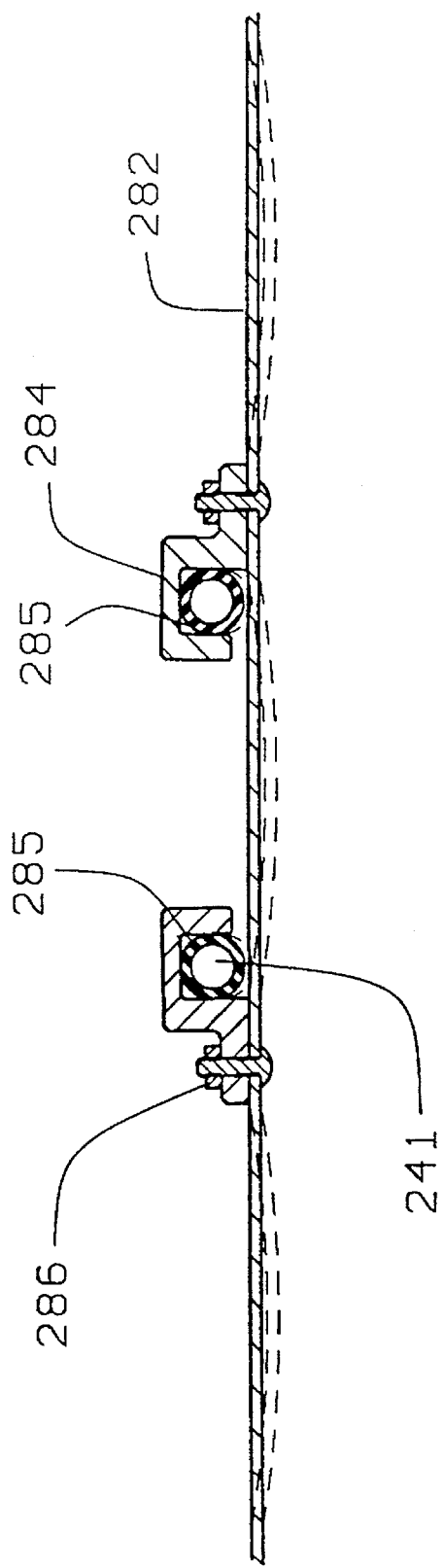
FIG. 22 is a section along the line 22—22 shown in FIG. 20.

As shown in FIG. 22, which is a section along the line 22—22 of FIG. 20, a hose 241 extends through channels 285 in channel members 284. Channels 285 support the walls of hose 241 on three sides. A portion of hose 241 projects out of channels 285 and is in contact with wall 282. As shown in dotted outline in FIG. 22, when a water hammer pressure pulse is delivered through hose 241, wall 282 is distorted. It can be appreciated that when a continuous series of separated, high pressure pulses are delivered through hose 241 that wall 282 will shake continuously. The interaction of hose 241 with wall 282 is essentially the same as the interaction of hose 241 with fins 264, as described above with reference to FIG. 17.

Figure 23:
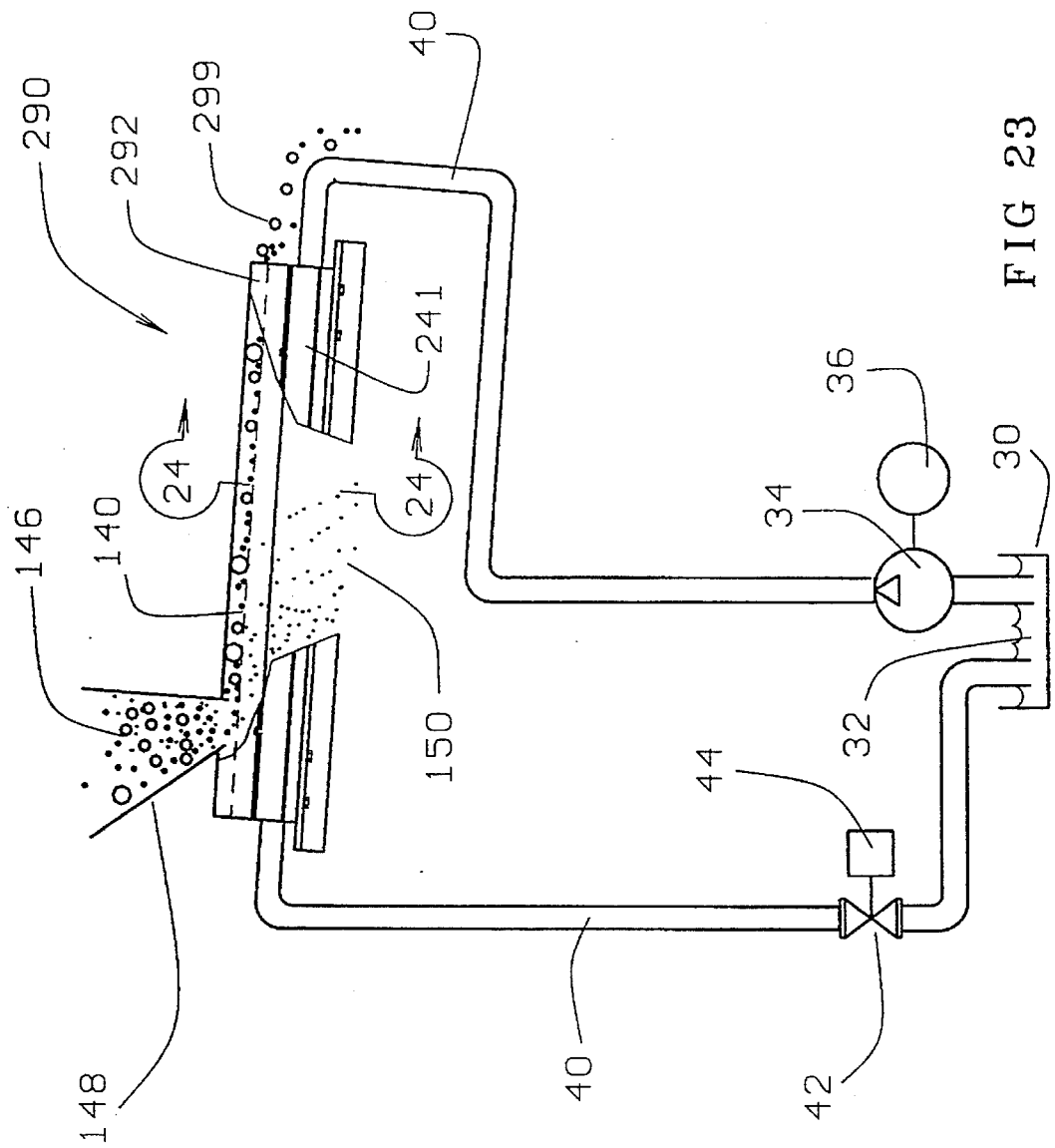
FIG. 23 is a partially schematic view of a vibrating screen according to the invention.

As shown in FIG. 23, the invention can be used for shaking other sorts of machinery, such as a screen assembly 290. High pressure pulses are generated in a conduit 40, as described above with reference to FIG. 16. The high pressure pulses propagate through one or more hoses, 241 in screen assembly 290.

Screen assembly 290 comprises a frame 292, which supports a mesh 140. Mesh 140 is stretched across frame 292 and is affixed by clamps 142. Particulate matter 146 is fed onto mesh 140 from a hopper 148. As mesh 140 is shaken, fine particles, 150 drop through mesh 140, where they can be collected. Coarser particles, 299, fall off the end of screen mesh 140.

Figure 24:
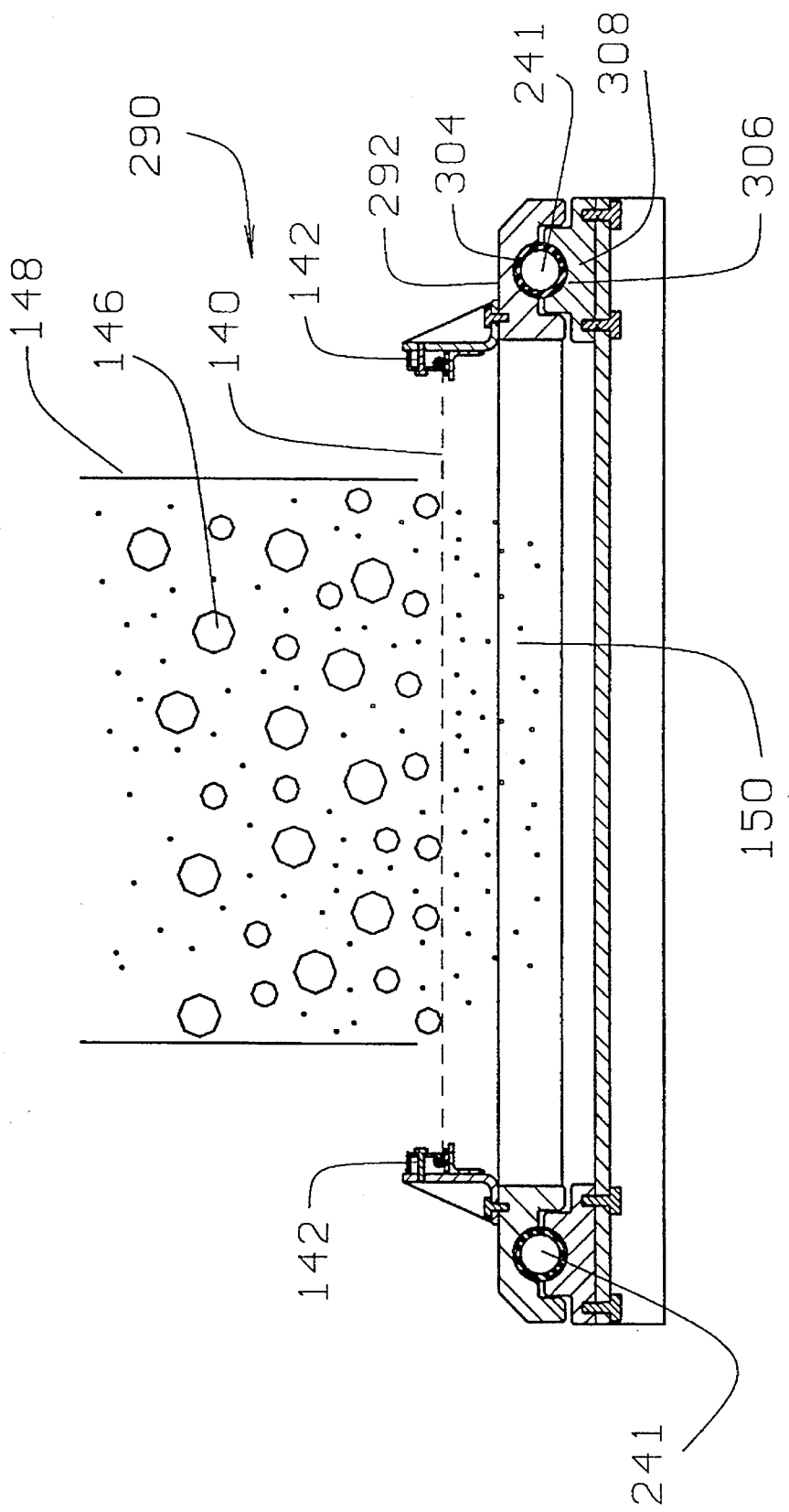
FIG. 24 is a sectional view through the vibrating screen of FIG. 23.

FIG. 24 is a section through the screen assembly of FIG. 23. A hose 241 passes through apertures which extend through each side of the frame of screen 290. The apertures are formed by channels 304, 306 in frame 292 and sub-frame, 308 respectively. It can be appreciated that when a high pressure pulse is delivered to hose 241, frame 292 is pushed apart from sub-frame 308. After the high pressure pulse passes the weight of frame 292 causes frame 292 to drop back toward sub-frame 308. Applying a continuous series of high pressure pulses to hoses 241 causes frame 292 and mesh 140 to shake up and down at the frequency of the water hammer pulses.

Figure 25:
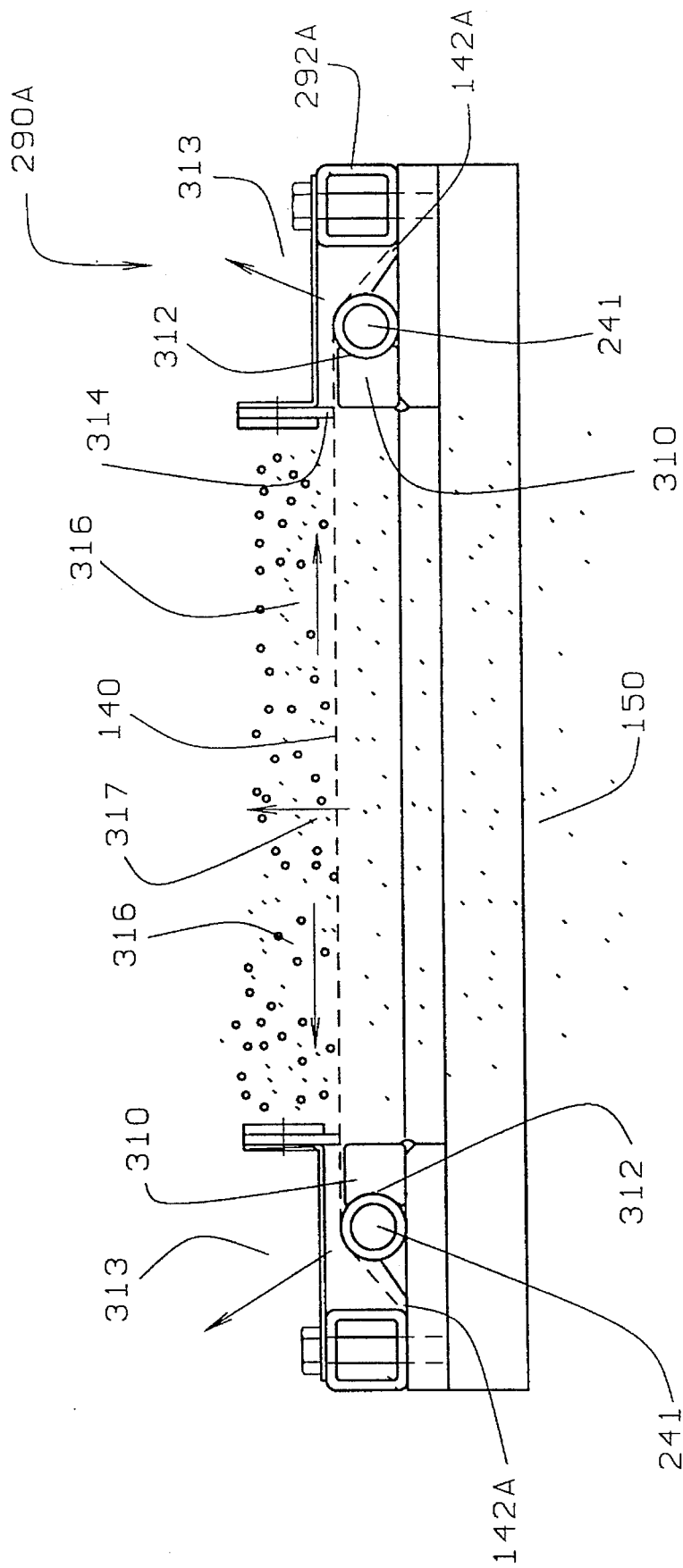
FIG. 25 is a section through an alternative vibrating screen according to the invention.

FIGS. 25 and 26 show an alternative screen shaking apparatus 290A. Apparatus 290A comprises a mesh 140 which is stretched between clamps 142A over hoses 241. Hoses 241 are supported in a frame 292A by blocks 310 which extend along hoses 241 toward the center of frame 292A. Mesh 140 stretches over the top of hoses 241 and is pulled down at an angle to clamps 142A. Preferably the portions of blocks 310 in contact with hoses 241 comprise a shaped groove 312 which conforms to the shape of the outer walls of hoses 241.

Hoses 241 may be two portions of a single hose 241, may be separate hoses both connected to the same conduit 40, or may be driven by separate water hammer driving systems comprising separate conduits 40 and valves 42.

When high pressure water hammer pulses are simultaneously delivered to hoses 241 then mesh 140 is very rapidly pushed upwardly and outwardly at the points where it bends over the tops of hoses 241 as shown by arrows 313. This causes the central portion of mesh 140 to be stretched laterally, as indicated by arrows 316 and, at the same time, accelerates mesh 140 upwardly, as indicated by arrow 317. A rubber guard 314 may be provided on either side of mesh 140 to prevent particles from falling off the sides of mesh 140.

Screen 290A has the advantage that mesh 140 is periodically stretched laterally as it is vibrated. This tends to make mesh 140 resistant to becoming plugged. A particle which becomes lodged between the wires of mesh 140 will tend to be released in the next cycle, when mesh 140 is suddenly stretched outwardly and is simultaneously shaken upwardly. FIG. 26 is a top-plan view of screen shaking assembly 290A of FIG. 25.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A vibrator for vibrating a structure, said vibrator comprising:
   (a) a hydraulic driving system comprising:
      i) a conduit having an inlet and an outlet;
      ii) a source of pressurized fluid connected to said inlet;
      iii) a valve in said conduit;
      iv) a valve actuator connected to said valve for repeatedly opening and closing said valve to create a continuous series of water hammers in said conduit;
   (b) an actuator in fluid communication with said conduit upstream from said valve, said actuator comprising:
      i) a wall enclosing a fluid-filled volume;

ii) means for transmitting changes in a pressure in said conduit into said fluid-filled volume; and
iii) a movable section in said wall, said movable section displaceable between a first position and a second position by increasing a fluid pressure in said fluid filled volume;

iv) means for holding said movable section of said wall in contact with a member to be vibrated; and,
v) bias means biasing said movable wall toward said first position.

* * * * *